United States Patent
Yamaguchi et al.

(10) Patent No.: US 8,173,297 B2
(45) Date of Patent: May 8, 2012

(54) ELECTROLYTIC SOLUTION CONTAINING AN ACYL HALIDE AND BATTERY CONTAINING SAME

(75) Inventors: Hiroyuki Yamaguchi, Fukushima (JP); Masayuki Ihara, Fukushima (JP); Tadahiko Kubota, Kanagawa (JP)

(73) Assignee: Sony Corporation, Tokyo (JP)

( * ) Notice: Subject to any disclaimer, the term of this patent is extended or adjusted under 35 U.S.C. 154(b) by 1290 days.

(21) Appl. No.: 11/844,805

(22) Filed: Aug. 24, 2007

(65) Prior Publication Data
US 2008/0076031 A1    Mar. 27, 2008

(30) Foreign Application Priority Data

Aug. 25, 2006  (JP) .................................. 2006-229502
Jul. 11, 2007  (JP) .................................. 2007-182275

(51) Int. Cl.
*H01M 6/04*    (2006.01)

(52) U.S. Cl. ......... 429/199; 429/326; 429/188; 429/324

(58) Field of Classification Search .................. 429/324, 429/188, 199, 326
See application file for complete search history.

(56) References Cited

U.S. PATENT DOCUMENTS

| | | | |
|---|---|---|---|
| 4,740,436 A * | 4/1988 | Kobayashi et al. | 429/213 |
| 5,529,859 A * | 6/1996 | Shu et al. | 429/331 |
| 7,659,026 B2 * | 2/2010 | Teasley | 429/494 |
| 7,790,312 B2 * | 9/2010 | Costello et al. | 429/188 |
| 2002/0086213 A1* | 7/2002 | Utsugi et al. | 429/231.95 |
| 2004/0091782 A1* | 5/2004 | Kawano et al. | 429/231.8 |
| 2005/0181277 A1* | 8/2005 | Koga et al. | 429/221 |
| 2006/0134525 A1* | 6/2006 | Kleijnen et al. | 429/249 |
| 2006/0147808 A1* | 7/2006 | Xiao et al. | 429/326 |

FOREIGN PATENT DOCUMENTS

| | | |
|---|---|---|
| EP | 1744394 | 1/2007 |
| JP | 1-134872 | 5/1989 |
| JP | 5-82168 | 4/1993 |
| JP | 2000353524 A * | 12/2000 |
| JP | 2006-49112 | 2/2006 |
| JP | 2006-49152 | 2/2006 |

* cited by examiner

*Primary Examiner* — Barbara Gilliam
*Assistant Examiner* — Zachary Best
(74) *Attorney, Agent, or Firm* — K&L Gates LLP

(57) ABSTRACT

A battery capable of improving at least one of high-temperature storage characteristics and high-temperature cycle characteristics is provided. A battery includes a cathode, an anode and an electrolytic solution, and a separator arranged between the cathode and the anode is impregnated with the electrolytic solution. The electrolytic solution includes an acyl halide such as succinyl chloride or succinyl fluoride as well as a solvent and an electrolyte salt.

30 Claims, 4 Drawing Sheets

ELECTROLYTIC SOLUTION CONTAINING AN ACYL HALIDE AND BATTERY CONTAINING SAME

CROSS REFERENCES TO RELATED APPLICATIONS

The present application claims priority to Japanese Patent Application JP 2006-229502 filed in the Japanese Patent Office on Aug. 25, 2006 and Japanese Patent Application JP 2007-182275 filed in the Japanese Patent Office on Jul. 11, 2007, the entire contents of which is being incorporated herein by references.

BACKGROUND

The present application relates to an electrolytic solution including a solvent and an electrolyte salt and a battery using the electrolytic solution.

In recent years, portable electronic devices such as camcorders, cellular phones and portable computers have become widespread, and size and weight reduction in the portable electronic devices and long-term continuous operation of the portable electronic devices have been strongly demanded. Accordingly, as power sources for the portable electronic devices, the development of batteries, specifically lightweight secondary batteries capable of obtaining a high energy density have been promoted.

Among them, a secondary battery (a so-called lithium-ion secondary battery) using insertion and extraction of lithium for charge-discharge reaction, a secondary battery (so-called lithium metal secondary battery) using precipitation and dissolution of lithium, and the like hold great promise, because, because the secondary batteries can obtain a large energy density, compared to a lead-acid battery or a nickel-cadmium battery.

To improve various performance capabilities, some techniques relating to the compositions of electrolytic solutions used in these secondary batteries have already been proposed. More specifically, to improve high-temperature continuous charge characteristics and high-temperature storage characteristics, a technique of including a compound which includes a fluorosulfonyl group in an electrolytic solution is known (for example, refer to Japanese Unexamined Patent Application Publication Nos. 2006-49112 and 2006-49152). Moreover, to improve storage characteristics and cycle characteristics, a technique of including a cyclic compound which includes two or more ketone groups in an electrolytic solution is known (for example, Japanese Unexamined Patent Application Publication No. H5-82168). Further, to improve overdischarge characteristics, a technique of including succinic anhydride in an electrolytic solution is known (for example, refer to Japanese Unexamined Patent Application Publication No. H1-134872).

SUMMARY

As the heating values of recent electronic devices tend to increase more and more because of factors such as enhancement of performance of electronic parts typified by CPUs (central processing units), the performance of the secondary batteries at high temperature tends to be easily degraded. Therefore, further improvement in high-temperature storage characteristics or high-temperature cycle characteristics of the secondary batteries is desired.

In view of the foregoing, it is desirable to provide an electrolytic solution and a battery capable of improving at least one of high-temperature storage characteristics and high-temperature cycle characteristics.

According to an embodiment, there is provided an electrolytic solution including: a solvent; an electrolyte salt; and an acyl halide. Moreover, according to an embodiment, there is provided a battery including a cathode, an anode and an electrolytic solution, wherein the electrolytic solution includes: a solvent; an electrolyte salt; and an acyl halide.

In the electrolytic solution according to the embodiment, an acyl halide is included, so compared to the case where the acyl halide is not included, in the case where the electrolytic solution is used in an electrochemical device such as a battery, a coating including a halogen is easily formed on an electrode. Thereby, in a battery using the electrolytic solution according to an embodiment, the decomposition reaction of the electrolytic solution at high temperature is prevented, so at least one of high-temperature storage characteristics and high-temperature cycle characteristics can be improved.

Additional features and advantages are described herein, and will be apparent from, the following Detailed Description and the figures.

DETAILED DESCRIPTION

Figure 1:
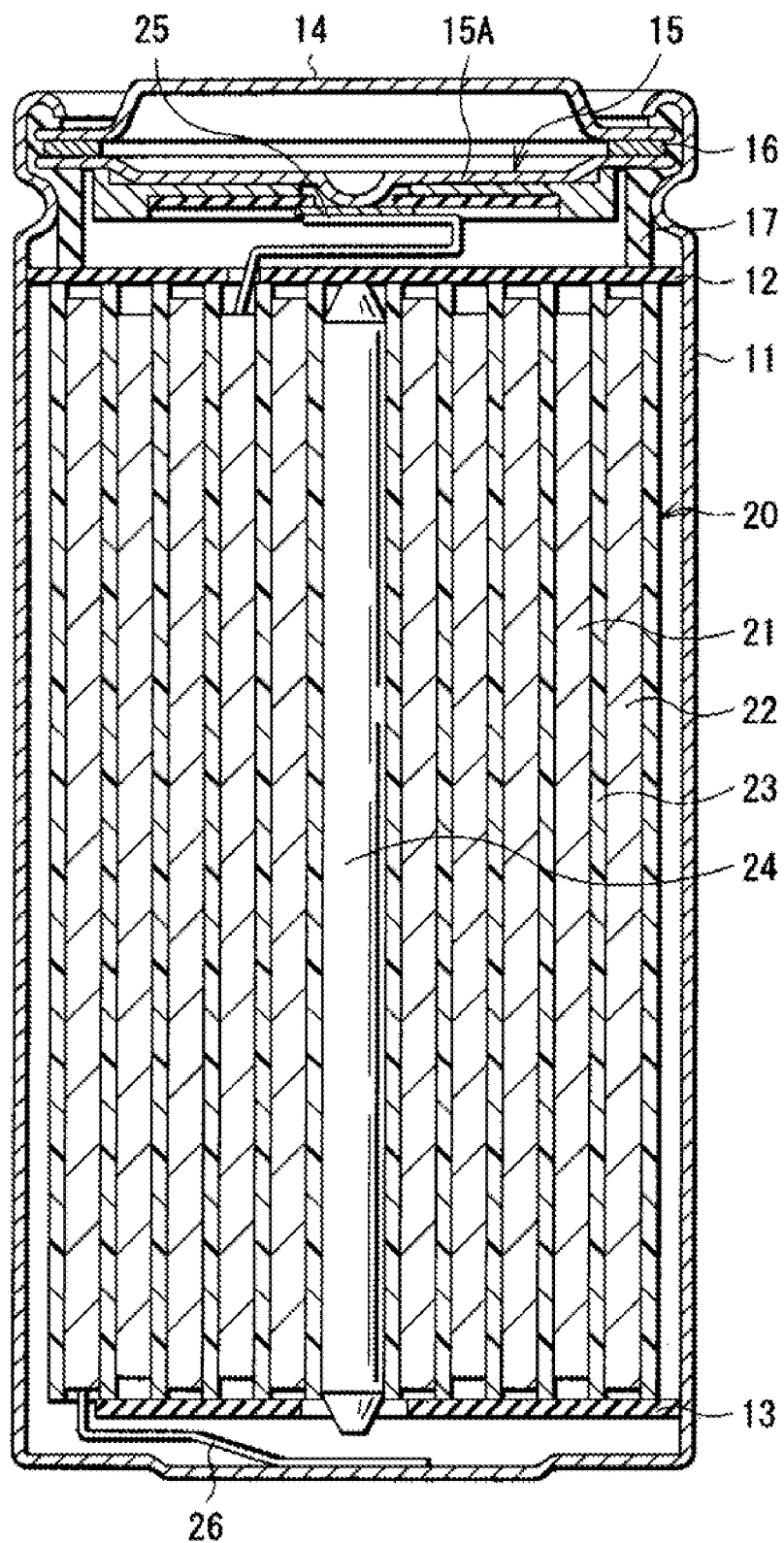
FIG. 1 is a sectional view showing the configuration of a first battery using an electrolytic solution according to an embodiment.

A preferred embodiment will be described in detail below referring to the accompanying drawings.

An electrolytic solution according to an embodiment is used in an electrochemical device such as a battery, and includes a solvent, an electrolyte salt and an acyl halide. The electrolytic solution includes the acyl halide, because the decomposition reaction of the electrolytic solution is prevented, so superior high-temperature characteristics and superior high-temperature cycle characteristics can be obtained in the electrochemical device including the electrolytic solution.

The acyl halide is a generic name for a carboxylic acid including a halogen as an element, and the kind of halogen can be selected arbitrarily. Examples of an acyl chloride including chlorine as an element include oxalyl chloride, succinyl chloride, malonyl chloride, dimethylmalonyl chloride, glutaryl chloride, adipyl chloride, azelayl chloride, sebacoyl chloride, acetyl chloride, propionyl chloride, butyryl chloride, valeryl chloride, caproyl chloride, caprylyl chloride, pivalyl chloride, acrylyl chloride, methacrylyl chloride, crotonyl chloride, adamantanecarboxylic chloride, maleyl chloride, fumaryl chloride, benzoyl chloride, phthalyl chloride, isophthalyl chloride, terephthalyl chloride, benzenetricarboxylic chloride and the like. Examples of an acyl fluoride including fluorine as an element include oxalyl fluoride, succinyl fluoride, malonyl fluoride, dimethylmalonyl fluoride, glutaryl fluoride, adipyl fluoride, azelayl fluoride, sebacoyl fluoride, acetyl fluoride, propionyl fluoride, butyryl fluoride, valeryl fluoride, caproyl fluoride, caprylyl fluoride, pivalyl fluoride, acrylyl fluoride, methacrylyl fluoride, crotonyl fluoride, adamantanecarboxylic fluoride, maleyl fluoride, fumaryl fluoride, benzoyl fluoride, phthalyl fluoride, isophthalyl fluoride, terephthalyl fluoride, benzenetricarboxylic fluoride and the like. In addition to them, any of a series of the above-described compounds in which chlorine or fluorine substitutes for at least a part of hydrogen may be used. Only one kind or a mixture of two or more kinds selected from them may be used. The content of the acyl halide in the electrolytic solution is preferably within a range from 0.01 wt % to 5 wt %, both inclusive. Among them, the acyl halide preferably includes an acyl fluoride, because a higher effect can be obtained.

The solvent includes, for example, a nonaqueous solvent such as an organic solvent. The nonaqueous solvent includes at least one kind selected from the group consisting of a chain carbonate and a cyclic carbonate, and examples of the chain carbonate and the cyclic carbonate include ethylene carbonate, propylene carbonate, butylene carbonate, 1,3-dioxol-2-one, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, dimethyl sulfoxide phosphate and the like. It is because in the electrochemical device including the electrolytic solution, superior capacity characteristics, superior high-temperature storage characteristics and superior high-temperature cycle characteristics can be obtained. Only one kind or a mixture of two or more kinds selected from them may be used. Among them, the solvent preferably includes a mixture of a high-viscosity (high-permittivity) solvent (for example, relative permittivity $\epsilon \geqq 30$) such as ethylene carbonate or propylene carbonate and a low-viscosity solvent (for example, viscosity $\leqq 1$ mPa·s) such as dimethyl carbonate, ethyl methyl carbonate or diethyl carbonate. It is because the dissociation property of the electrolyte salt and ion mobility are improved, so a higher effect can be obtained.

In particular, the chain carbonate and the cyclic carbonate preferably include at least one kind selected from the group consisting of a chain carbonate shown in Chemical Formula 1 which includes a halogen as an element and a cyclic carbonate shown in Chemical Formula 2 which includes a halogen as an element, because a higher effect can be obtained.

[Chemical Formula 1]

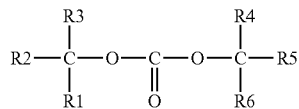

where R1 to R6 each represent a hydrogen group, a halogen group, an alkyl group or a halogenated alkyl group, and may be the same as or different from one another, and at least one of R1 to R6 includes a halogen as an element.

[Chemical Formula 2]

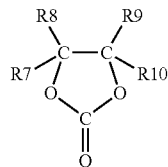

where R7 to R10 each represent a hydrogen group, a halogen group, an alkyl group or a halogenated alkyl group, and may be the same as or different from one another, and at least one of R7 to R10 includes a halogen as an element.

As the chain carbonate shown in Chemical Formula 1 which includes a halogen as an element, fluoromethyl methyl carbonate, bis(fluoromethyl) carbonate, difluoromethyl methyl carbonate and the like are cited. Only one kind or a mixture of two or more kinds selected from them may be used.

As the cyclic carbonate shown in Chemical Formula 2 which includes a halogen as an element, in the case where R7 to R10 each are an alkyl group or a halogenated alkyl group, the number of carbon atoms in the alkyl group or the halogenated alkyl group is preferably 1 or 2. Specifically, as the cyclic carbonate a series of compounds shown in Chemical Formulas 3 and 4 are cited. More specifically, 4-fluoro-1,3-dioxolane-2-one in Chemical Formula 3(1), 4-chloro-1,3-dioxolane-2-one in Chemical Formula 3(2), 4,5-difluoro-1,3-dioxolane-2-one in Chemical Formula 3(3), tetrafluoro-1,3-dioxolane-2-one in Chemical Formula 3(4), 4-fluoro-5-chloro-1,3-dioxolane-2-one in Chemical Formula 3(5), 4,5-dichloro-1,3-dioxolane-2-one in Chemical Formula 3(6), tetrachloro-1,3-dioxolane-2-one in Chemical Formula 3(7), 4,5-bistrifluoromethyl-1,3-dioxolane-2-one in Chemical Formula 3(8), 4-trifluoromethyl-1,3-dioxolane-2-one in Chemical Formula 3(9), 4,5-difluoro-4,5-dimethyl-1,3-dioxolane-2-one in Chemical Formula 3(10), 4-methyl-5,5-difluoro-1,3-dioxolane-2-one in Chemical Formula 3(11), 4-ethyl-5,5-difluoro-1,3-dioxolane-2-one in Chemical Formula 3(12) and the like are cited. Moreover, 4-trifluoromethyl-5-fluoro-1,3-dioxolane-2-one in Chemical Formula 4(1), 4-trifluoromethyl-5-methyl-1,3-dioxolane-2-one in Chemical Formula 4(2), 4-fluoro-4,5-dimethyl-1,3-dioxolane-2-one in Chemical Formula 4(3), 4,4-difluoro-5-(1,1-difluoroethyl)-1,3-dioxolane-2-one in Chemical Formula 4(4), 4,5-dichloro-4,5-dimethyl-1,3-dioxolane-2-one in Chemical Formula 4(5), 4-ethyl-5-fluoro-1,3-dioxolane-2-one in Chemical Formula 4(6), 4-ethyl-4,5-difluoro-1,3-dioxolane-2-one in Chemical Formula 4(7), 4-ethyl-4,5,5-trifluoro-1,3-dioxolane-2-one in Chemical Formula 4(8), 4-fluoro-4-methyl-1,3-dioxolane-2-one in Chemical Formula 4(9) and the like are cited. Only one kind or a mixture of two or more kinds selected from them may be used. Among them, as the cyclic carbonate including a halogen as an element, 4-fluoro-1,3-dioxolane-2-one in Chemical Formula 3(1) is preferable, and 4,5-difluoro-1,3-dioxolane-2-one in Chemical Formula 3(3) is more preferable. It is because they are easily available, and a higher effect can be obtained. In particular, as 4,5-difluoro-1,3-dioxolane-2-one, to obtain a higher effect, a trans-isomer is more preferable than a cis-isomer.

[Chemical Formula 3]

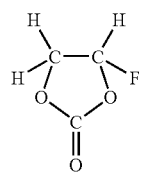

(1)

-continued
(2)
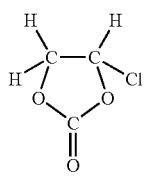
(3)
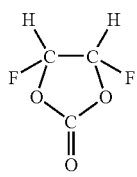
(4)
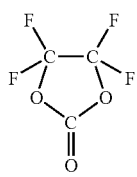
(5)
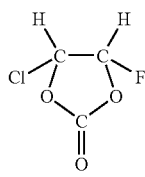
(6)
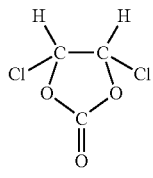
(7)
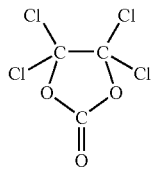
(8)
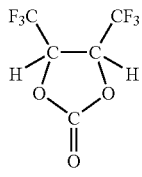
(9)
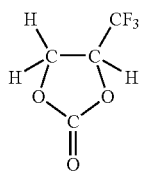
(10)
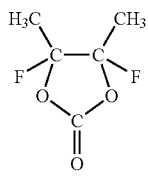
-continued
(11)
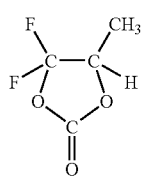
(12)
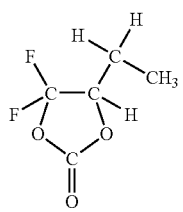
[Chemical Formula 4]
(1)
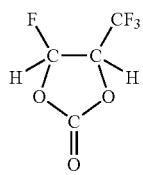
(2)
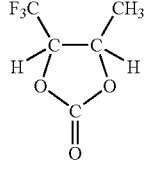
(3)
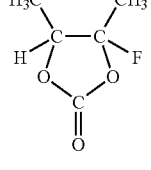
(4)
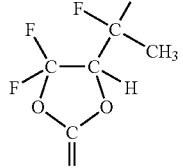
(5)
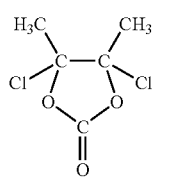
(6)
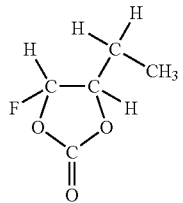

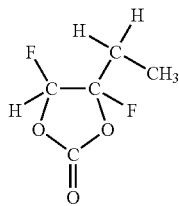

(7)

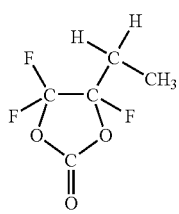

(8)

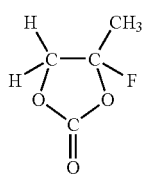

(9)

Moreover, the cyclic carbonate preferably includes a cyclic carbonate including an unsaturated bond, because a higher effect can be obtained. As the cyclic carbonate including an unsaturated bond, vinylene carbonate, vinylethylene carbonate and the like are cited. Only one kind or a mixture of two or more kinds selected from them may be used. Among them, the cyclic carbonate including an unsaturated bond preferably includes vinylene carbonate, because a higher effect can be obtained. In particular, in the case where the solvent includes the above-described chain carbonate including a halogen as an element or the above-described cyclic carbonate including a halogen as an element, when the solvent further includes the cyclic carbonate including an unsaturated bond, an extremely high effect can be obtained.

In addition, to obtain a higher effect, the solvent may include any compound as an additive, except for the above-described compounds. Examples of the additive include an acid anhydride, a compound including a sulfone bond ($-SO_2-$) and the like. It is because in the electrochemical device including the electrolytic solution, a coating is formed on an electrode, so superior high-temperature storage characteristics or superior high-temperature cycle characteristics can be obtained. Only one kind or a mixture of two or more kinds selected from them may be used. For example, as the acid anhydride, at least one kind selected from the group consisting of succinic anhydride, glutaric anhydride and maleic anhydride is cited, and as the compound including a sulfone bond, at least one kind selected from the group consisting of propane sultone, propene sultone and divinylsulfone is cited. The content of the additive in the electrolytic solution is preferably within a range from 0.01 wt % to 5 wt % both inclusive, and more preferably within a range from 0.5 wt % to 5 wt % both inclusive.

The electrolyte salt includes, for example, a light metal salt such as a lithium salt. As the lithium salt, lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenyl borate ($LiB(C_6H_5)_4$), lithium methanesulfonate ($LiCH_3SO_3$), lithium trifluoromethanesulfonate ($LiCF_3SO_3$), lithium tetrachloroaluminate ($LiAlCl_4$), lithium hexafluorosilicate ($Li_2SiF_6$), lithium chloride (LiCl), lithium bromide (LiBr) and the like are cited. Only one kind or a mixture of two or more kinds selected from them may be used. Among them, the electrolyte salt preferably includes lithium hexafluorophosphate, because internal resistance is reduced, so in the electrochemical device including the electrolytic solution, superior capacity characteristics, superior high-temperature storage characteristics and superior high-temperature cycle characteristics can be obtained.

In particular, the electrolyte salt preferably includes a compound shown in Chemical Formula 5, because a higher effect can be obtained. The compound shown in Chemical Formula 5 may include a compound shown in Chemical Formula 6. In the case where the electrolyte salt includes the above-described lithium hexafluorophosphate or the like, when the electrolyte salt further includes the compound shown in Chemical Formula 5 or 6, an extremely high effect can be obtained.

[Chemical Formula 5]

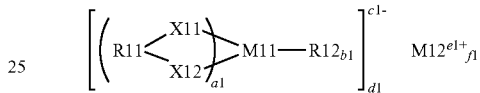

where R11 represents a $-CO-R13-CO-$ group (R13 represents an alkylene group, a halogenated alkylene group, an arylene group or a halogenated arylene group), a $-CO-C(R14)(R15)-CO-$ group (R14 and R15 each represent a hydrogen group, a halogen group, an alkyl group, a halogenated alkyl group, an aryl group or a halogenated aryl group) or a $-CO-CO-$ group, R12 represents a halogen group, an alkyl group, a halogenated alkyl group, an aryl group or a halogenated aryl group, X11 and X12 each represent oxygen (O) or sulfur (S), M11 represents a transition metal element or a Group 3B element, a Group 4B element or a Group 5B element in the short form of the periodic table of the elements, M12 represents a Group 1A element or a Group 2A element in the short form of the periodic table of the elements, a1 is an integer of 1 to 4, b1 is 0 or an integer of 1 to 8, and c1 to f1 each are an integer of 1 to 3.

[Chemical Formula 6]

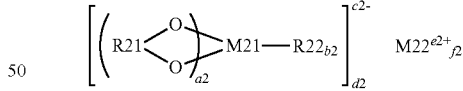

where R21 represents a $-CO-R23-CO-$ group (R23 represents an alkylene group, a halogenated alkylene group, an arylene group or a halogenated arylene group), a $-CO-C(R24)_2-CO-$ group (R24 represents a hydrogen group, a halogen group, an alkyl group, a halogenated alkyl group, an aryl group or a halogenated aryl group) or a $-CO-CO-$ group, R22 represents a halogen group, M21 represents phosphorus (P) or boron (B), M22 represents a Group 1A element or a Group 2A element in the short form of the periodic table of the elements, a2 is an integer of 1 to 4, b2 is 0 or an integer of 2 or 4, c2 to f2 each are an integer of 1 to 3.

As the compound shown in Chemical Formula 6, a series of compounds shown in Chemical Formula 7 are cited. More specifically, difluoro[oxalate-O,O']lithium borate in Chemical Formula 7(1), difluoro bis[oxalate-O,O']lithium phosphate in Chemical Formula 7(2), difluoro[3,3,3-trifluoro-2-oxide-2-trifluoromethyl propionato(2-)-O,O']lithium borate in Chemical Formula 7(3), bis[3,3,3-trifluoro-2-oxide-2-trifluoromethyl propionato(2-)-O,O']lithium borate in Chemical Formula 7(4), tetrafluoro[oxalate-O,O']lithium phosphate in Chemical Formula 7(5), bis[oxalate-O,O']lithium borate in Chemical Formula 7(6) and the like are cited. Only one kind or a mixture of two or more kinds selected from them may be used. Among them, the electrolyte salt preferably includes difluoro[oxalate-O,O']lithium borate in Chemical Formula 7(1) or bis[oxalate-O,O']lithium borate in Chemical Formula 7(6), because a higher effect can be obtained.

[Chemical Formula 7]

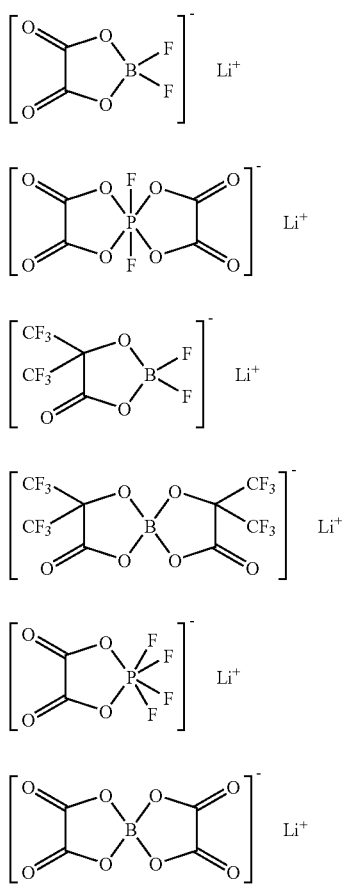

Moreover, the electrolyte salt preferably includes at least one kind selected from the group consisting of compounds shown in Chemical Formulas 8 to 10, because a higher effect can be obtained. In the case where the electrolyte salt includes the above-described lithium hexafluorophosphate or the like, when the electrolyte salt further includes the compounds shown in Chemical Formulas 8 to 10, an extremely high effect can be obtained.

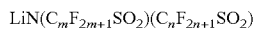 [Chemical Formula 8]

where m and n each are an integer of 1 or more, and may be the same as or different from each other.

[Chemical Formula 9]

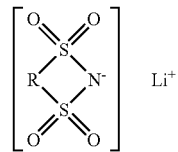

where R represents a straight-chain or branch perfluoroalkylene group having 2 to 5 carbon atoms.

 [Chemical Formula 10]

where p, q and r each are an integer of 1 or more, and may be the same as or different from one another.

As the chain compound shown in Chemical Formula 8, lithium bis(trifluoromethanesulfonyl)imide (LiN(CF$_3$SO$_2$)$_2$), lithium bis(pentafluoroethanesulfonyl)imide (LiN(C$_2$F$_5$SO$_2$)$_2$), lithium (trifluoromethanesulfonyl)(pentafluoroethanesulfonyl)imide (LiN(CF$_3$SO$_2$)(C$_2$F$_5$SO$_2$)), lithium (trifluoromethanesulfonyl)(heptafluoropropanesulfonyl)imide (LiN(CF$_3$SO$_2$)(C$_3$F$_7$SO$_2$)) or lithium (trifluoromethanesulfonyl)(nonafluorobutanesulfonyl)imide (LiN(CF$_3$SO$_2$)(C$_4$F$_9$SO$_2$)) and the like are cited. Only one kind or a mixture of two or more kinds selected from them may be used.

As the cyclic compound shown in Chemical Formula 9, a series of compounds shown in Chemical Formula 11 are cited. More specifically, lithium 1,2-perfluoroethanedisulfonylimide in Chemical Formula 11(1), lithium 1,3-perfluoropropanedisulfonylimide in Chemical Formula 11(2), lithium 1,3-perfluorobutanedisulfonylimide in Chemical Formula 11(3), lithium 1,4-perfluorobutanedisulfonylimide in Chemical Formula 11(4) and the like are cited. Only one kind or a mixture of two or more kinds selected from them may be used. Among them, the electrolyte salt preferably includes lithium 1,3-perfluoropropanedisulfonylimide in Chemical Formula 11 (2), because a higher effect can be obtained.

[Chemical Formula 11]

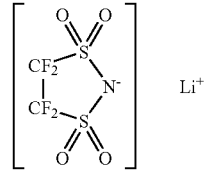

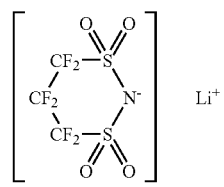

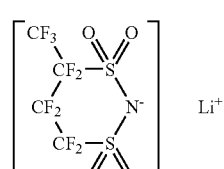

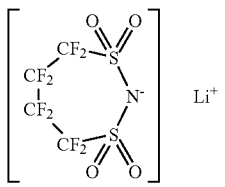

(4)

As the chain compound shown in Chemical Formula 10, lithium tris(trifluoromethanesulfonyl)methide (LiC(CF$_3$SO$_2$)$_3$) or the like is cited.

The content of the electrolyte salt is preferably within a range from 0.3 mol/kg to 3.0 mol/kg both inclusive relative to the solvent. When the content of the electrolyte salt is out of the range, ionic conductivity is extremely reduced, so it may be difficult to obtain sufficient capacity characteristics or the like in the electrochemical device including the electrolytic solution.

In the electrolytic solution, the acyl halide is included in addition to the solvent and the electrolyte salt, so compared to the case where the acyl halide is not included, in the case where the electrolytic solution is used in the electrochemical device such as a battery, a coating including a halogen is easily formed on an electrode. Therefore, the decomposition reaction of the electrolytic solution at high temperature is prevented, so at least one of the high-temperature storage characteristics and the high-temperature cycle characteristics can be improved in the electrochemical device such as a battery. In this case, when the content of the acyl halide in the electrolytic solution is within a range from 0.01 wt % to 5 wt % both inclusive, and the acyl halide includes an acyl fluoride, characteristics can be further improved. In particular, in the case where a sulfonyl halide is included, high-temperature cycle characteristics tend to be degraded, but on the other hand, in the case where the acyl halide is included, the high-temperature cycle characteristics tend to resist degradation.

In particular, when the solvent includes the chain carbonate shown in Chemical Formula 1 which includes a halogen as an element or the cyclic carbonates shown in Chemical Formulas 2 to 4 which include a halogen as an element, and further includes the carbonate including an unsaturated bond such as vinylene carbonate, characteristics can be further improved. Moreover, when the electrolyte salt includes lithium hexafluorophosphate or the like, and further includes the compounds shown in Chemical Formulas 5 to 10, characteristics can be further improved.

Next, application examples of the above-described electrolytic solution will be described below. As an example of the electrochemical device, a battery is cited, and the electrolytic solution is used in a battery as below.

(First Battery)

FIG. 1 shows a sectional view of a first battery. In this battery, the capacity of an anode is represented by a capacity component based on insertion and extraction of lithium as an electrode reactant, and the battery is a so-called a lithium-ion secondary battery. FIG. 1 shows a battery configuration called a so-called cylindrical type, and the battery includes a spirally wound electrode body 20 which includes a cathode 21 and an anode 22 spirally wound with a separator 23 in between and a pair of insulating plates 12 and 13 in a substantially hollow cylindrical-shaped battery can 11. The battery can 11 is made of, for example, nickel (Ni)-plated iron (Fe). An end portion of the battery can 11 is closed, and the other end portion thereof is opened. The pair of insulating plates 12 and 13 are arranged so that the spirally wound electrode body 20 is sandwiched therebetween in a direction perpendicular to a peripheral winding surface.

In the opened end portion of the battery can 11, a battery cover 14, and a safety valve mechanism 15 and a positive temperature coefficient device (PTC device) 16 arranged inside the battery cover 14 are mounted by caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and in the safety valve mechanism 15, when an internal pressure in the battery increases to a certain extent or higher due to an internal short circuit or external application of heat, a disk plate 15A is flipped so as to disconnect the electrical connection between the battery cover 14 and the spirally wound electrode body 20. When a temperature rises, the PTC device 16 limits a current by an increased resistance to prevent abnormal heat generation by a large current. The gasket 17 is made of, for example, an insulating material, and its surface is coated with asphalt.

A center pin 24 is inserted into the center of the spirally wound electrode body 20. In the spirally wound electrode body 20, a cathode lead 25 made of aluminum (Al) or the like is connected to the cathode 21, and an anode lead 26 made of nickel or the like is connected to the anode 22. The cathode lead 25 is welded to the safety valve mechanism 15 so as to be electrically connected to the battery cover 14, and the anode lead 26 is welded to the battery can 11 so as to be electrically connected to the battery can 11.

Figure 2:
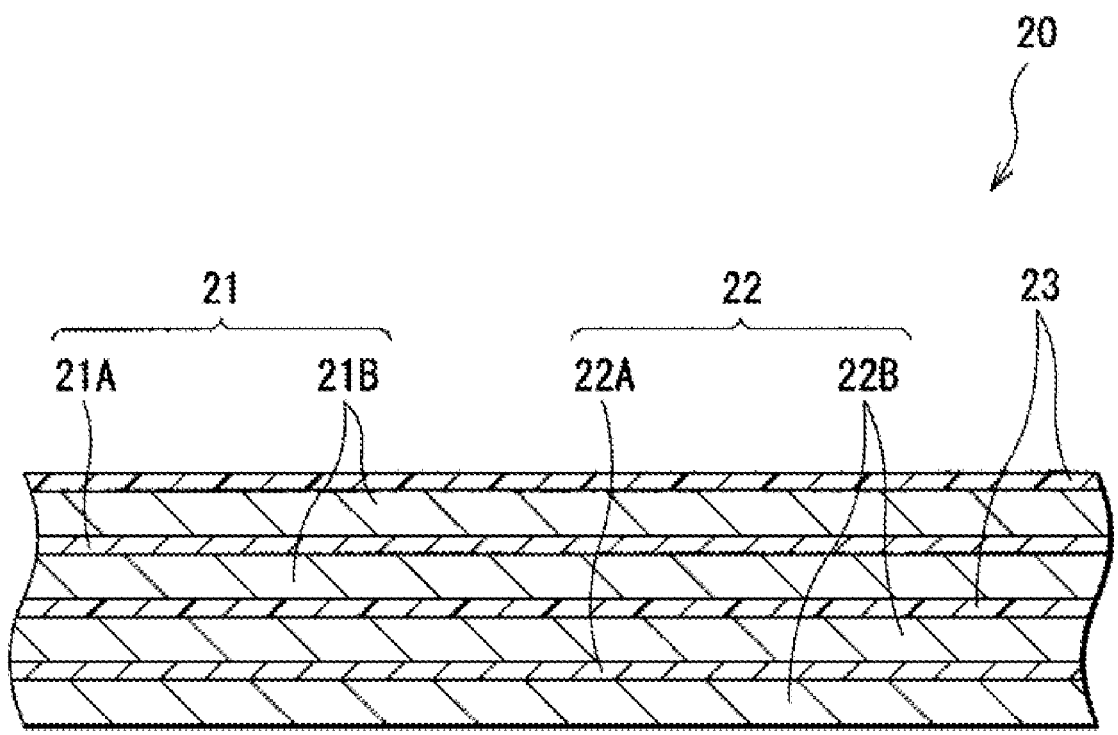
FIG. 2 is a partially enlarged sectional view of a spirally wound electrode body shown in FIG. 1.

FIG. 2 shows an enlarged view of a part of the spirally wound electrode body 20 shown in FIG. 1. The cathode 21 is formed by arranging a cathode active material layer 21B on both sides of a cathode current collector 21A having a pair of facing surfaces. The cathode current collector 21A is made of, for example, a metal material such as aluminum, nickel or stainless. The cathode active material layer 21B includes one kind or two or more kinds of cathode materials capable of inserting and extracting lithium as an electrode reactant. The cathode active material layer 21B may include an electrical conductor such as a carbon material and a binder such as polyvinylidene fluoride, if necessary.

As the cathode material capable of inserting and extracting lithium, for example, lithium cobalt oxide, lithium nickel oxide, a solid solution including lithium cobalt oxide and lithium nickel oxide (Li(Ni$_x$Co$_y$Mn$_z$)O$_2$; the values of x, y and z are $0 \leq x \leq 1, 0 \leq y \leq 1$ and $0 \leq z \leq 1$, and x+y+z=1), lithium complex oxide such as lithium manganese oxide (LiMn$_2$O$_4$) with a spinel structure or a solid solution thereof (Li(Mn$_{2-v}$Ni$_v$)O$_4$; the value of v is v<2), or a phosphate compound with an olivine structure such as lithium iron phosphate (LiFePO$_4$) is preferable, because a high energy density can be obtained. Moreover, examples of the cathode material capable of inserting and extracting lithium include oxides such as titanium oxide, vanadium oxide and manganese dioxide, bisulfides such as iron bisulfide, titanium bisulfide and molybdenum sulfide, sulfur, and conductive polymers such as polyaniline and polythiophene.

The anode 22 is formed by arranging an anode active material layer 22B on both sides of an anode current collector 22A having a pair of facing surfaces. The anode current collector 22A is made of, for example, a metal material such as copper (Cu), nickel or stainless. The anode active material layer 22B includes, for example, one kind or two or more kinds of anode materials capable of inserting and extracting lithium as an anode active material. The anode active material layer 22B may include an electrical conductor, a binder or the like if necessary.

As the anode material capable of inserting and extracting lithium, for example, a material which can insert and extract lithium and includes at least one kind selected from the group consisting of metal elements and metalloid elements as an element is cited. Such an anode material is preferably used, because a high energy density can be obtained. The anode material may include the simple substance, an alloy or a compound of a metal element or a metalloid element, and may include a phase of one kind or two or more kinds selected from them at least in part. In the application, the alloy includes an alloy including one or more kinds of metal elements and one or more kinds of metalloid elements in addition to an alloy including two or more kinds of metal elements. Further, the alloy may include a non-metal element. As the texture of the alloy, a solid solution, a eutectic (eutectic mixture), an intermetallic compound or the coexistence of two or more kinds selected from them is cited.

Examples of the metal elements or the metalloid elements included in the anode material include metal elements and metalloid elements capable of forming an alloy with lithium. More specifically, magnesium (Mg), boron (B), aluminum, gallium (Ga), indium (In), silicon, germanium (Ge), tin, lead (Pb), bismuth (Bi), cadmium (Cd), silver (Ag), zinc (Zn), haffnium (Hf), zirconium (Zr), yttrium (Y), palladium (Pd), platinum (Pt) or the like is included. Among them, silicon or tin is specifically preferable, because silicon and tin have a large capability to insert and extract lithium, so a high energy density can be obtained.

As such an anode material, for example, an anode material including tin as a first element, a second element and a third element is preferable. The second element includes at least one kind selected from the group consisting of cobalt (Co), iron, magnesium, titanium (Ti), vanadium (V), chromium (Cr), manganese (Mn), nickel, copper, zinc, gallium, zirconium, niobium (Nb), molybdenum (Mo), silver, indium, cerium (Ce), hafnium, tantalum (Ta), tungsten (W), bismuth and silicon. The third element includes at least one kind selected from the group consisting of boron, carbon (C), aluminum and phosphorus (P). When the second element and the third element are included, cycle characteristics can be improved.

Among them, as the anode material, a CoSnC-containing material in which tin, cobalt and carbon are included as elements, and the carbon content is within a range from 9.9 wt % to 29.7 wt % both inclusive, and the ratio of cobalt to the total of tin and cobalt (Co/(Sn+Co)) is within a range from 30 wt % to 70 wt % both inclusive is preferable, because a high energy density and superior cycle characteristics can be obtained in such a composition range.

The CoSnC-containing material may further include any other element, if necessary. As the element, for example, silicon, iron, nickel, chromium, indium, niobium, germanium, titanium, molybdenum, aluminum, phosphorus, gallium, bismuth or the like is preferable, and two or more kinds selected from them may be included. It is because the capacity or the cycle characteristics can be further improved.

The CoSnC-containing material includes a phase including tin, cobalt and carbon, and the phase preferably has a low crystalline structure or an amorphous structure. Moreover, in the CoSnC-containing material, at least a part of carbon as an element is preferably bonded to a metal element or a metalloid element as another element. It is considered that a decline in the cycle characteristics is caused by cohesion or crystallization of tin or the like, and when carbon is bonded to another element, such cohesion or crystallization can be prevented.

As a measuring method for checking the bonding state of an element, for example, X-ray photoelectron spectroscopy (XPS) is used. In the XPS, the peak of the 1s orbit (C1s) of carbon in the case of graphite is observed at 284.5 eV in an apparatus in which energy calibration is performed so that the peak of the 4f orbit (Au4f) of a gold atom is observed at 84.0 eV. Moreover, the peak of C1s of the surface contamination carbon is observed at 284.8 eV. On the other hand, in the case where the charge density of the carbon element increases, for example, in the case where carbon is bonded to a metal element or a metalloid element, the peak of C1s is observed in a region lower than 284.5 eV. In other words, in the case where the peak of the composite wave of C1s obtained in the CoSnC-containing material is observed in a region lower than 284.5 eV, at least a part of carbon included in the CoSnC-containing material is bonded to the metal element or the metalloid element which is another element.

Moreover, in the XPS measurement, for example, the peak of C1s is used to correct the energy axis of a spectrum. In general, surface contamination carbon exists on a material surface, so the peak of C1s of the surface contamination carbon is fixed at 284.8 eV, and the peak is used as an energy reference. In the XPS measurement, the waveform of the peak of C1s is obtained as a form including the peak of the surface contamination carbon and the peak of carbon in the CoSnC-containing material, so the peak of the surface contamination carbon and the peak of the carbon in the CoSnC-containing material are separated by analyzing the waveform through the use of, for example, commercially available software. In the analysis of the waveform, the position of a main peak existing on a lowest binding energy side is used as an energy reference (284.8 eV).

As the anode material capable of inserting and extracting lithium, for example, a carbon material such as graphite, non-graphitizable carbon or graphitizable carbon is used. The carbon material and the above-described anode material may be used together. In the carbon material, a change in crystal structure according to insertion and extraction of lithium is very small, so the carbon material is preferably used together with the above-described anode material, because a high energy density and superior cycle characteristics can be obtained, and the carbon material also functions as an electrical conductor.

In the secondary battery, the amounts of the cathode active material and the anode material capable of inserting and extracting lithium are adjusted so that a charge capacity by the anode material capable of inserting and extracting lithium becomes larger than a charge capacity by the cathode active material, thereby lithium metal is not precipitated on the anode 22 even at the time of full charge.

The separator 23 isolates between the cathode 21 and the anode 22 so that lithium ions pass therethrough while preventing a short circuit of a current due to contact between the cathode 21 and the anode 22. The separator 23 is made of, for example, a porous film of a synthetic resin such as polytetrafluoroethylene, polypropylene or polyethylene, or a porous ceramic film, and the separator 23 may have a structure in which two or more kinds of the porous films are laminated.

The separator 23 is impregnated with the above-described electrolytic solution as a liquid electrolyte, because the high-temperature storage characteristics and the high-temperature cycle characteristics can be improved.

The secondary battery can be manufactured by the following steps, for example.

At first, for example, the cathode active material layer 21B is formed on both sides of the cathode current collector 21A so as to form the cathode 21. The cathode active material layer 21B is formed by the following steps. A cathode mixture formed by mixing cathode active material powder, the electrical conductor and the binder is dispersed in a solvent such as N-methyl-2-pyrrolidone to form paste-form cathode mixture slurry, and the cathode mixture slurry is applied to the cathode current collector 21A, and the cathode mixture slurry is dried and compression molded, thereby the cathode active material layer 21B is formed. Moreover, for example, by the same steps as those in the case of the cathode 21, the anode 22 is formed by forming the anode active material layer 22B on the both sides of the anode current collector 22A.

Next, the cathode lead 25 is attached to the cathode current collector 21A by welding, and the anode lead 26 is attached to the anode current collector 22A by welding. Then, the cathode 21 and the anode 22 are spirally wound with the separator 23 in between so as to form the spirally wound electrode body 20, and an end of the cathode lead 25 is welded to the safety valve mechanism 15, and an end of the anode lead 26 is welded to the battery can 11. Next, the spirally wound electrode body 20 is sandwiched between the pair of insulating plates 12 and 13, and they are contained in the battery can 11. Next, the electrolytic solution is injected into the battery can 11 so as to impregnate the separator 23 with the electrolytic solution. Finally, the battery cover 14, the safety valve mechanism 15 and the PTC device 16 are fixed in an opened end portion of the battery can 11 by caulking by the gasket 17. Thereby, the secondary battery shown in FIGS. 1 and 2 is completed.

When the secondary battery is charged, lithium ions are extracted from the cathode 21, and are inserted into the anode 22 through the electrolytic solution. On the other hand, when the secondary battery is discharged, the lithium ions are extracted from the anode 22 and are inserted into the cathode 21 through the electrolytic solution.

In the secondary battery, in the case where the capacity of the anode is represented by a capacity component based on insertion and extraction of lithium, the electrolytic solution includes an acyl halide, so at least one of the high-temperature storage characteristics and the high-temperature cycle characteristics can be improved.

(Second Battery)

A second battery has the same configuration, functions and effects as those of the first battery, except for the configuration of an anode 22 is different, and the second battery can be manufactured by the same method as that of the first battery. Therefore, the second battery will be described referring to FIGS. 1 and 2, and like components are denoted by like numerals as of the first battery, and will not be further described.

The anode 22 has a configuration in which the anode active material layer 22B is arranged on both sides of the anode current collector 22A as in the case of the first battery. The anode active material layer 22B includes, for example, an anode active material including tin or silicon as an element. More specifically, for example, the anode active material includes the simple substance, an alloy or a compound of tin, or the simple substance, an alloy or a compound of silicon, and the anode active material may include two or more kinds selected from them.

The anode active material layer 22B is formed by, for example, a vapor-phase method, a liquid-phase method, a spraying method or a firing method, or a combination of two or more methods selected from them, and the anode active material layer 22B and the anode current collector 22A are preferably alloyed in at least a part of an interface therebetween. More specifically, in the interface, an element of the anode current collector 22A is preferably diffused into the anode active material layer 22B, or an element of the anode active material is preferably diffused into the anode current collector 22A, or they are preferably diffused into each other, because a fracture of the anode active material layer 22B due to swelling and shrinkage thereof according to charge and discharge can be inhibited, and the electronic conductivity between the anode active material layer 22B and the anode current collector 22A can be improved.

As the vapor-phase method, for example, a physical deposition method or a chemical deposition method can be used, and more specifically, a vacuum deposition method, a sputtering method, an ion plating method, a laser ablation method, a thermal CVD (chemical vapor deposition) method, a plasma chemical vapor deposition method or the like can be used. As the liquid-phase method, a known technique such as electrolytic plating or electroless plating can be used. In the firing method, for example, a particulate anode active material is mixed with a binder or the like to form a mixture, and the mixture is applied by dispersing the mixture in a solvent, and then the mixture is heated at a higher temperature than the melting point of the binder or the like. As the firing method, a known technique such as, for example, an atmosphere firing method, a reaction firing method or a hot press firing method can be used.

(Third Battery)

In a third battery, the capacity of the anode 22 is represented by a capacity component based on precipitation and dissolution of lithium, and the third battery is a so-called lithium metal secondary battery. The secondary battery has the same configuration as that of the first battery, except that the anode active material layer 22B is made of lithium metal, and the secondary battery can be manufactured by the same method as that of the first battery. Therefore, the third battery will be described referring to FIGS. 1 and 2, and like components are denoted by like numerals as of the first battery, and will not be further described.

The secondary battery uses lithium metal as the anode active material, so a higher energy density can be obtained. The anode active material layer 22B may exist at the time of assembling, or may not exist at the time of assembling, and may be formed of lithium metal precipitated at the time of charge. Moreover, the anode active material layer 22B may be used also as a current collector, thereby the anode current collector 22A may be removed.

When the secondary battery is charged, lithium ions are extracted from the cathode 21, and the lithium ions are precipitated on the surface of the anode current collector 22A as lithium metal through the electrolytic solution. When the secondary battery is discharged, the lithium metal is dissolved from the anode active material layer 22B as lithium ions, and the lithium ions are inserted into the cathode 21 through the electrolytic solution.

In the secondary battery, in the case where the capacity of the anode is represented by a capacity component based on precipitation and dissolution of lithium, the electrolytic solution includes an acyl halide, so at least one of the high-temperature storage characteristics and the high-temperature cycle characteristics can be improved.

(Fourth Battery)

Figure 3:
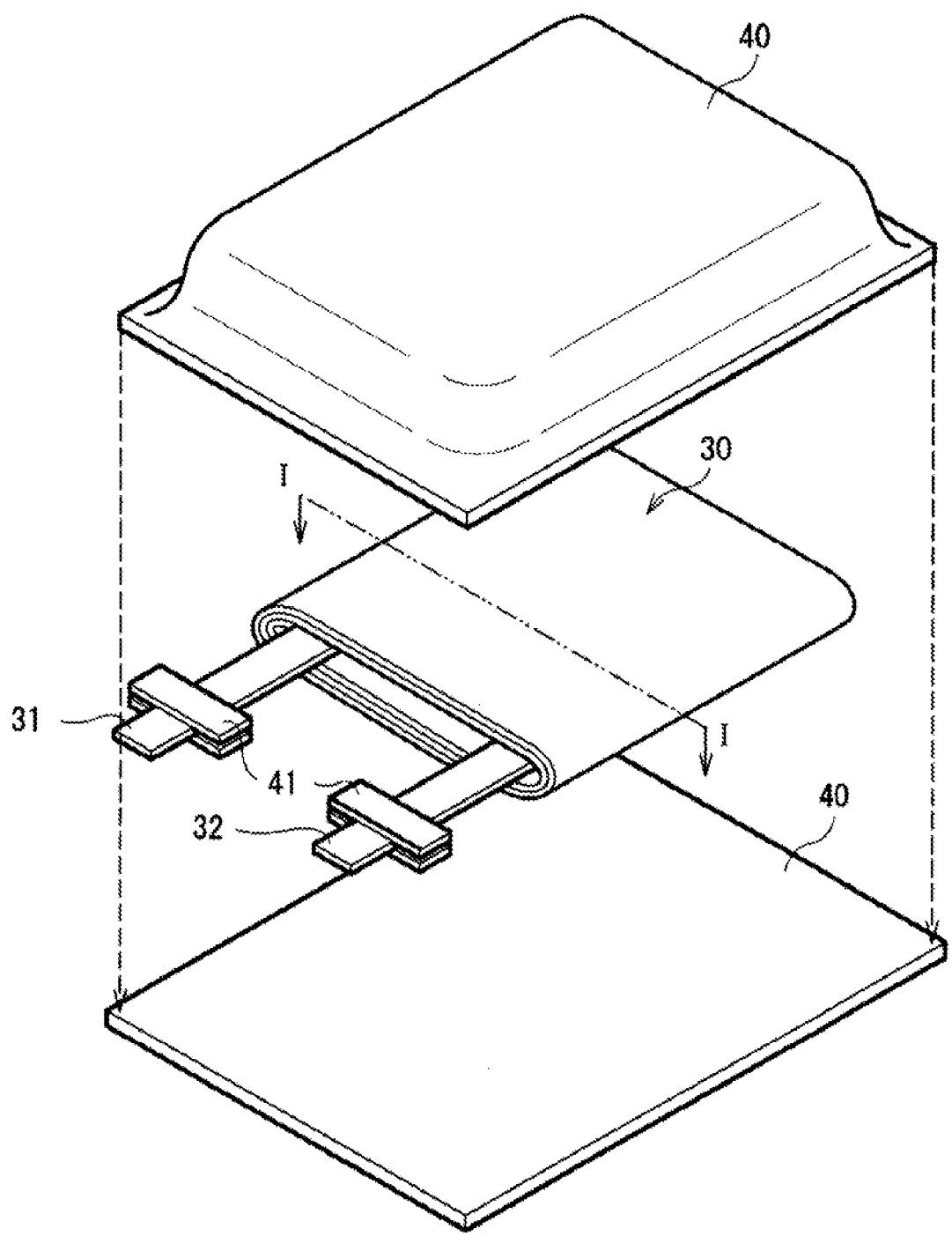
FIG. 3 is an exploded perspective view of a fourth battery using the electrolytic solution according to an embodiment.

FIG. 3 shows an exploded perspective view of a fourth battery. In the battery, a spirally wound electrode body 30 to which a cathode lead 31 and an anode lead 32 are attached is contained in film-shaped package members 40, and the configuration of the battery is a so-called laminate film type.

The cathode lead 31 and the anode lead 32 are drawn, for example, from the interiors of the package members 40 to outside in the same direction. The cathode lead 31 and the anode lead 32 are made of, for example, a metal material such as aluminum, copper, nickel or stainless in a sheet shape or a mesh shape.

The package members 40 are made of, for example, a rectangular aluminum laminate film including a nylon film, aluminum foil and a polyethylene film which are bonded in this order. The package members 40 are arranged so that the polyethylene film of each of the package members 40 faces the spirally wound electrode body 30, and edge portions of the package members 40 are adhered to each other by fusion bonding or an adhesive. An adhesive film 41 is inserted between the package members 40 and the cathode lead 31 and the anode lead 32 for preventing the entry of outside air. The adhesive film 41 is made of, for example, a material having adhesion to the cathode lead 31 and the anode lead 32, for example, a polyolefin resin such as polyethylene, polypropylene, modified polyethylene or modified polypropylene.

In addition, the package members 40 may be made of a laminate film with any other configuration, a polymer film such as polypropylene or a metal film instead of the above-described three-layer aluminum laminate film.

Figure 4:
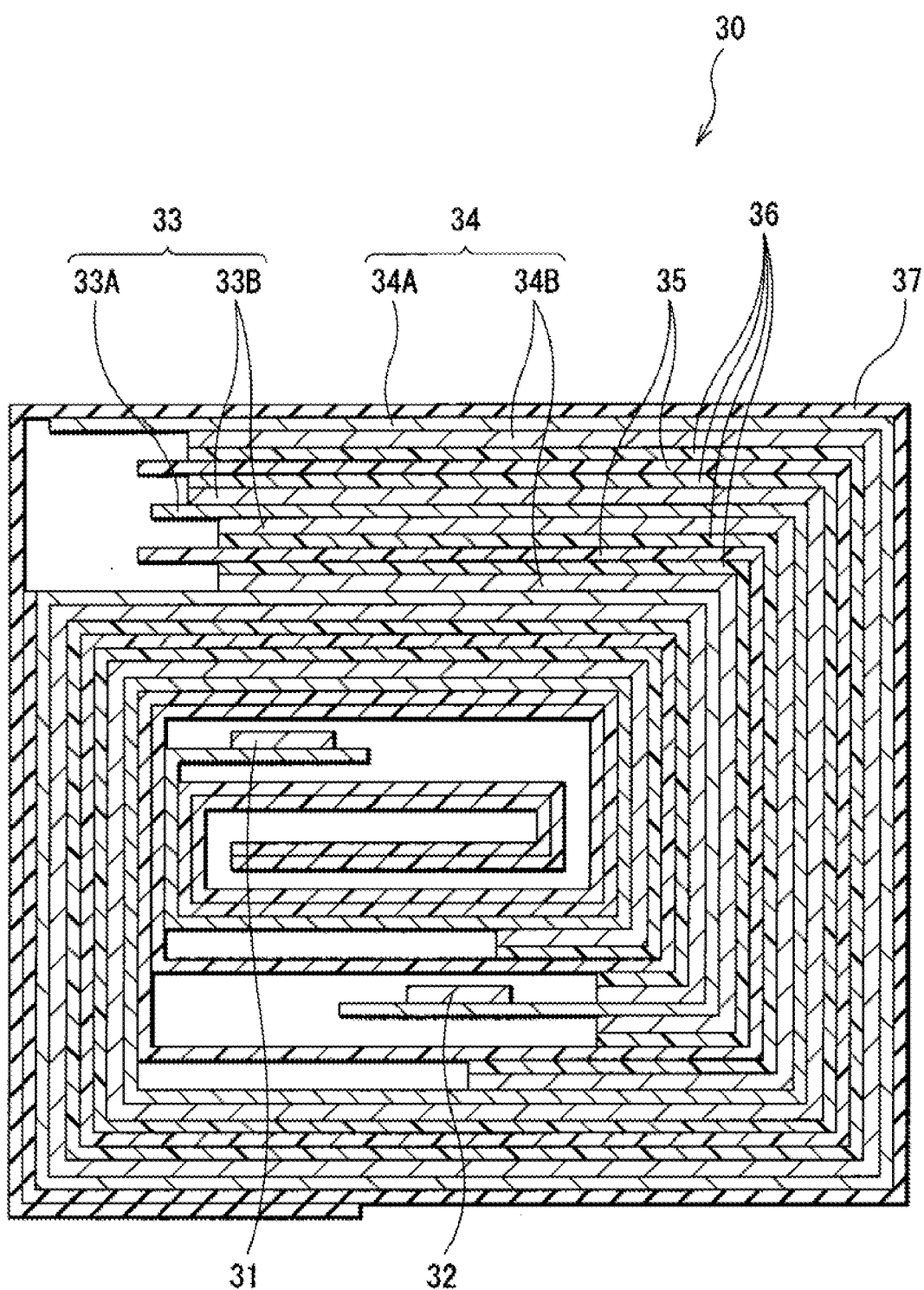
FIG. 4 is a sectional view of a spirally wound electrode body taken along a line I-I of FIG. 3.

FIG. 4 shows a sectional view of the spirally wound electrode body 30 taken along a line I-I of FIG. 3. The spirally wound electrode body 30 is a spirally wound laminate including a cathode 33 and an anode 34 with a separator 35 and an electrolyte 36 in between, and an outermost portion of the spirally wound electrode body 30 is protected with a protective tape 37.

The cathode 33 is formed by arranging a cathode active material layer 33B on both sides of a cathode current collector 33A. The anode 34 is formed by arranging an anode active material layer 34B on both sides of an anode current collector 34A, and the anode 34 is arranged so that the anode active material layer 34B faces the cathode active material layer 33B. The configurations of the cathode current collector 33A, the cathode active material layer 33B, the anode current collector 34A, the anode active material layer 34B and the separator 35 are the same as those of the cathode current collector 21A, the cathode active material layer 21B, the anode current collector 22A, the anode active material layer 22B and the separator 23 in the above-described first and second batteries, respectively.

The electrolyte 36 includes the above-described electrolytic solution and a polymer compound as a holding body of the electrolytic solution, and is a so-called gel electrolyte. The gel electrolyte is preferable, because the gel electrolyte can obtain high ionic conductivity (for example, 1 mS/cm or over at room temperature), and leakage of an electrolyte from the battery can be prevented.

Examples of the polymer compound include polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, poly(methyl methacrylate), polyacrylic acids, polymethacrylic acids, styrene-butadiene rubber, nitrile-butadiene rubber, polystyrene, polycarbonate and the like. One kind or a mixture of a plurality of kinds selected from them may be used. In particular, in terms of electrochemical stability, polyacrylonitrile, polyvinylidene fluoride, polyhexafluoropropylene, polyethylene oxide or the like is preferably used. The content of the polymer compound in the electrolytic solution depends on compatibility between them, but is preferably within a range from 5 wt % to 50 wt % both inclusive.

The content of the electrolyte salt is the same as that in the above-described electrolytic solution. The solvent in this case has a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

In addition, as the electrolyte 36, instead of an electrolyte in which the polymer compound holds the electrolytic solution, the electrolytic solution may be used as it is. In this case, the separator 35 is impregnated with the electrolytic solution.

The secondary battery can be manufactured by the following steps, for example.

At first, the electrolyte 36 is formed by applying a precursor solution including the electrolytic solution, the polymer compound and a mixing solvent to the cathode 33 and the anode 34, and volatilizing the mixing solvent. Next, the cathode lead 31 is attached to the cathode current collector 33A, and the anode lead 32 is attached to the anode current collector 34A. Next, after the cathode 33 on which the electrolyte 36 is formed and the anode 34 on which the electrolyte 36 is formed are laminated with the separator 35 in between to form a laminate, the laminate is spirally wound in a longitudinal direction, and the protective tape 37 is bonded to an outermost portion of the laminate so as to form the spirally wound electrode body 30. Then, for example, the spirally wound electrode body 30 is sandwiched between the package members 40, and edge portions of the package members 40 are adhered to each other by thermal fusion bonding or the like to seal the spirally wound electrode body 30 in the package members 40. At this time, the adhesive film 41 is inserted between the cathode lead 31 the anode lead 32 and the package members 40. Thereby, the secondary battery shown in FIGS. 3 and 4 is completed.

Moreover, the battery may be manufactured by the following steps. At first, after the cathode lead 31 and the anode lead 32 are attached to the cathode 33 and the anode 34, respectively, the cathode 33 and the anode 34 are laminated with the separator 35 in between to form a laminate, and the laminate is spirally wound, and the protective tape 37 is bonded to an outermost portion of the spirally wound laminate so as to form a spirally wound body as a precursor body of the spirally wound electrode body 30. Next, the spirally wound body is sandwiched between the package members 40, and the edge portions of the package members 40 except for edge portions on one side are adhered by thermal fusion bonding or the like to form a pouched package, thereby the spirally wound body is contained in the package members 40. An electrolytic composition which includes the electrolytic solution, monomers as materials of a polymer compound and a polymerization initiator and, if necessary, any other material such as a polymerization inhibitor is prepared, and the composition is injected in the package members 40, and then an opened portion of the package members 40 are sealed by thermal fusion bonding or the like. Finally, the monomers are polymerized by applying heat to form the polymer compound, thereby the gel electrolyte 36 is formed. Thus, the secondary battery shown in FIGS. 3 and 4 is completed.

The functions and effects of the secondary battery are the same as those of the above-described first or second secondary battery.

EXAMPLES

Examples of the application will be described in detail below.

(1) Carbon-Based Anode

Firstly, laminate film type secondary batteries shown in FIGS. 3 and 4 were formed using artificial graphite as an anode active material. At that time, the secondary batteries were lithium-ion secondary batteries in which the capacity of the anode 34 was represented by a capacity component based on insertion and extraction of lithium.

Examples 1-1 to 1-3

At first, the cathode 33 was formed. More specifically, after lithium carbonate ($Li_2CO_3$) and cobalt carbonate ($COCO_3$) were mixed at a molar ratio of 0.5:1 to form a mixture, the mixture was fired in air at 900° C. for 5 hours to obtain lithium.cobalt complex oxide ($LiCoO_2$). Next, after 91 parts by weight of $LiCoO_2$ as a cathode active material, 6 parts by weight of graphite as an electrical conductor and 3 parts by weight of polyvinylidene fluoride (PVDF) as a binder were mixed to form a cathode mixture, the cathode mixture was dispersed in N-methyl-2-pyrrolidone as a solvent to form paste-form cathode mixture slurry. Next, after the cathode mixture slurry was applied to both sides of the cathode current collector 33A made of strip-shaped aluminum foil (with a thickness of 12 μm), and was dried, the cathode mixture slurry was compression molded by a roller press to form the cathode active material layer 33B. Finally, the cathode lead 31 made of aluminum was attached to an end of the cathode current collector 33A by welding.

Next, the anode 34 was formed. More specifically, after 90 parts by weight of artificial graphite powder as an anode active material and 10 parts by weight of PVDF as a binder were mixed to form an anode mixture, the anode mixture was dispersed in N-methyl-2-pyrrolidone as a solvent to form paste-form anode mixture slurry. Next, after the anode mixture slurry was applied to both sides of the anode current collector 34A made of strip-shaped copper foil (with a thickness of 15 μm), and was dried, the anode mixture slurry was compression molded by a roller press to form the anode active material layer 34B. Finally, the anode lead 32 made of nickel was attached to an end of the anode current collector 34A by welding.

Next, the cathode 33, the separator 35 made of a microporous polypropylene film (with a thickness of 25 μm) and the anode 34 were laminated in this order to form a laminate, and then the laminate was spirally wound in a longitudinal direction several times, and an outermost part was fixed by the protective tape 37 made of an adhesive tape to form a spirally wound body as a precursor body of the spirally wound electrode body 30. Next, after the spirally wound body was sandwiched between the package members 40 made of a laminate film with a three-layer structure (with a total thickness of 100 μm) in which nylon (with a thickness of 30 μm), aluminum (with a thickness of 40 μm) and cast polypropylene (with a thickness of 30 μm) were laminated, and the edge portions of the package members 40 except for edge portions on one side were adhered by thermal fusion bonding to form a pouched package, thereby the spirally wound body was contained in the package members 40. Next, the electrolytic solution was injected into the package members 40 through an opened portion of the package members 40, and the separator 35 was impregnated with the electrolytic solution, thereby the spirally wound electrode body 30 was formed.

As the electrolytic solution, a mixture solvent formed by mixing ethylene carbonate (EC) and diethyl carbonate (DEC) as a solvent, lithium hexafluorophosphate ($LiPF_6$) as an electrolyte salt, and succinyl chloride as an acyl halide were used. At that time, the composition of the mixture solvent was EC:DEC=2:3 as a weight ratio, the concentration of $LiPF_6$ in the electrolytic solution was 1 mol/kg. Moreover, the content of succinyl chloride in the electrolytic solution was 0.01 wt % (in Example 1-1), 0.5 wt % (in Example 1-2), and 5 wt % (in Example 1-3). In addition, "wt %" means a value in the case where the total content of the solvent and the acyl halide is 100 wt %, and the meaning of "wt %" is the same in the following description.

Finally, the opened portion of the package members 40 was sealed by thermal fusion bonding, thereby the laminate film type secondary batteries were completed.

Example 1-4

A secondary battery was formed by the same steps as those in Example 1-2, except that 1 wt % of vinylene carbonate (VC) was further included as a solvent.

Example 1-5

A secondary battery was formed by same steps as those in Example 1-2, except that 1 wt % of vinyl ethylene carbonate was further included as a solvent.

Example 1-6

A secondary battery was formed by the same steps as those in Example 1-2, except that 1 wt % of succinic anhydride (SCAH) was added to the solvent as an additive.

Example 1-7

A secondary battery was formed by the same steps as those in Example 1-2, except that 1 wt % of 1,3-propene sultone (PRS) was added to the solvent as an additive.

Example 1-8

A secondary battery was formed by the same steps as those in Example 1-2, except that the electrolytic solution included succinyl fluoride instead of succinyl chloride.

Example 1-9

A secondary battery was formed by the same steps as those in Example 1-2, except that instead of succinyl chloride, oxalyl fluoride was included. In this case, as oxalyl fluoride was a gas at room temperature, oxalyl fluoride was dissolved in the electrolytic solution while bubbling. At that time, the content ratio relative to $LiPF_6$ was determined by a nuclear magnetic resonance (NMR) method ($^{19}F$-NMR), and if necessary, the electrolytic solution was diluted, thereby the content of oxalyl fluoride was adjusted to be 0.5 wt %

Comparative Example 1-1

A secondary battery was formed by the same steps as those in Example 1-2, except that succinyl chloride was not included in the electrolytic solution.

Comparative Example 1-2

A secondary battery was formed by the same steps as those in Example 1-4, except that succinyl chloride was not included in the electrolytic solution.

When the high-temperature storage characteristics and the high-temperature cycle characteristics of the secondary batteries of Examples 1-1 to 1-9 and Comparative Examples 1-1 and 1-2 were determined, results shown in Table 1 were obtained.

To determine the high-temperature storage characteristics, after the secondary batteries were stored at high temperature by the following steps, the discharge capacity retention ratio was determined by calculation. At first, 2 cycles of charge and discharge were performed in an atmosphere at 23° C., and then the discharge capacity in the second cycle (the discharge capacity before storing at high temperature) was determined. Next, after the secondary batteries which were charged again were stored for 10 days in a constant temperature bath at 80° C., the secondary batteries were discharged in an atmosphere at 23° C., and then the discharge capacity (the discharge capacity after storing at high temperature) was determined.

discharge were performed in a constant temperature bath at 60° C., and then the discharge capacity in the 50th cycle (the discharge capacity after the high-temperature cycle) was determined. Thereby, the discharge capacity retention ratio (%)=(discharge capacity after high-temperature cycle/discharge capacity before high-temperature cycle)×100 was determined by calculation. The conditions of 1 cycle of charge and discharge were the same as those in the case where the high-temperature storage characteristics were determined.

In addition, the above-described steps, conditions and the like for determining the high-temperature storage characteristics and the high-temperature cycle characteristics were the same as in the case of the same characteristics of the following examples and the following comparative examples were determined.

TABLE 1

| | ANODE ACTIVE MATERIAL | ELECTROLYTE SALT | SOLVENT | ACYL HALIDE KIND | ACYL HALIDE CONCENTRATION (WT %) | DISCHARGE CAPACITY RETENTION RATIO (%) HIGH-TEMPERATURE STORAGE CHARACTERISTICS | DISCHARGE CAPACITY RETENTION RATIO (%) HIGH-TEMPERATURE CYCLE CHARACTERISTICS |
|---|---|---|---|---|---|---|---|
| EXAMPLE 1-1 | ARTIFICIAL GRAPHITE | LiPF$_6$ 1.0 mol/kg | EC – DEC | SUCCINYL CHLORIDE | 0.01 | 82 | 70 |
| EXAMPLE 1-2 | | | | | 0.5 | 83 | 75 |
| EXAMPLE 1-3 | | | | | 5 | 82 | 73 |
| EXAMPLE 1-4 | | | VC 1.0 WT % | | 0.5 | 85 | 82 |
| EXAMPLE 1-5 | | | VEC 1.0 WT % | | 0.5 | 83 | 78 |
| EXAMPLE 1-6 | | | SCAH 1.0 WT % | | 0.5 | 87 | 75 |
| EXAMPLE 1-7 | | | PRS 1.0 WT % | | 0.5 | 87 | 74 |
| EXAMPLE 1-8 | | | — | SUCCINYL FLUORIDE | 0.5 | 85 | 77 |
| EXAMPLE 1-9 | | | — | OXALYL FLUORIDE | 0.5 | 86 | 79 |
| COMPARATIVE EXAMPLE 1-1 | ARTIFICIAL GRAPHITE | LiPF$_6$ 1.0 mol/kg | EC – DEC | — | — | 81 | 70 |
| COMPARATIVE EXAMPLE 1-2 | | | VC 1.0 WT % | | | 82 | 80 |

Thereby, the discharge capacity retention ratio (%)=(discharge capacity after storing at high temperature/discharge capacity before storing at high temperature)×100 was determined by calculation. As the conditions of 1 cycle of charge and discharge, after the secondary batteries were charged at a constant current and a constant voltage under the condition that the charge current was 0.2 C until reaching an upper limit voltage of 4.2 V, the secondary batteries were discharged at a constant current under the condition that the discharge current was 0.2 C until reaching a final voltage of 2.5 V. In addition, "0.2 C" represents a current value at which the theoretical capacity of the battery can be discharged for 5 hours.

On the other hand, to determine the high-temperature cycle characteristics, after the secondary batteries were repeatedly charged and discharged by the following steps, the discharge capacity retention ratio was determined by calculation. At first, 2 cycles of charge and discharge were performed in an atmosphere at 23° C., and then the discharge capacity in the second cycle (the discharge capacity before the high-temperature cycle) was determined. Next, 50 cycles of charge and As shown in Table 1, in Examples 1-1 to 1-9 in which the electrolytic solution included an acyl halide, compared to Comparative Examples 1-1 and 1-2 in which the electrolytic solution did not include an acyl halide, the discharge capacity retention ratio in at least one of the high-temperature storage characteristics and the high-temperature cycle characteristics was higher.

More specifically, in Example 1-1 to 1-3, the discharge capacity retention ratio in the high-temperature storage characteristics was higher than that in Comparative Example 1-1, and in Examples 1-1 to 1-3, the discharge capacity retention ratio in the high-temperature cycle characteristics was equal to or higher than that in Comparative Example 1-1 In terms of the content of succinyl chloride, in Example 1-1 in which the content was 0.01 wt %, only the discharge capacity retention ratio in the high-temperature storage characteristics was higher; however, in Examples 1-2 and 1-3 in which the content was 0.5 wt % or 5 wt %, the discharge capacity retention ratio in the high-temperature storage characteristics or the high-temperature cycle characteristics was higher. Therefore, it was confirmed that in a secondary battery in which the anode 34 included artificial graphite as an anode active material, and the electrolytic solution included EC and DEC as solvents, when the electrolytic solution included an acyl halide, the high-temperature storage characteristics and the high-temperature cycle characteristics were improved. In particular, it was confirmed that the content of an acyl halide in the electrolytic solution was preferably within a range from 0.01 wt % to 5 wt % both inclusive, and more preferably within a range from 0.5 wt % to 5 wt % both inclusive.

Moreover, in Examples 1-4 to 1-7 in which VC or the like was added to EC and DEC as a solvent, compared to Example 1-2 in which only EC and DEC were included as solvents, the discharge capacity retention ratio in at least one of the high-temperature storage characteristics and the high-temperature cycle characteristics was higher. In other words, only in Example 1-5 in which VEC was added, the discharge capacity retention ratio in the high-temperature storage characteristics was the same as that in Example 1-2; however, in Examples 1-4, 1-6 and 1-7 in which VC, SCAH or PRS was added, the discharge capacity retention ratio was higher than that in Example 1-2. On the other hand, only in Example 1-7, the discharge capacity retention ratio in the high-temperature cycle characteristics was slightly lower than that in Example 1-2, and only in Example 1-6, the discharge capacity retention ratio was equal to that in Example 1-2; however, in Examples 1-4 and 1-5, the discharge capacity retention ratio was higher than that in Example 1-2. In terms of the kinds of added solvents, in Examples 1-6 and 1-7 in which SCAH or PRS was added, only the discharge capacity retention ratio in the high-temperature storage characteristics was higher; however, in Examples 1-4 and 1-5 in which VC or VEC was added, the discharge capacity retention ratios in the high-temperature storage characteristics and the high-temperature cycle characteristics were equal or higher. Further, the discharge capacity retention ratios in the high-temperature storage characteristics and the high-temperature cycle characteristics in Example 1-4 in which VC was added were higher than those in Example 1-5 in which VEC was added. It was also obvious from the relationship between Comparative Examples 1-1 and 1-2 that when VC was added, the discharge capacity retention ratios in the high-temperature storage characteristics and the high-temperature cycle characteristics were increased. Therefore, it was confirmed that when the VC, VEC, SCAH or PRS was added to EC and DEC as a solvent, the high-temperature storage characteristics or the high-temperature cycle characteristics were further improved. In particular, it was confirmed that for achieving further improvement in the characteristics, VEC was preferable, and VC was more preferable.

Further, in Example 1-8 in which succinyl fluoride was included and Example 1-9 in which oxalyl fluoride was included, compared to Example 1-2 in which succinyl chloride was included, the discharge capacity retention ratios in the high-temperature storage characteristics and the high-temperature cycle characteristics were higher. Therefore, it was confirmed that as an acyl halide, a fluoride was more preferable than a chloride.

Examples 2-1 to 2-7

Secondary batteries were formed by the same steps as those in Examples 1-1 to 1-5, 1-8 and 1-9, except that instead of EC, 4-fluoro-1,3-dioxolane-2-one (FEC) was used as a solvent.

Comparative Examples 2-1, 2-2

Secondary batteries were formed by the same steps as those in Examples 2-2 and 2-4, except that succinyl chloride was not included in the electrolytic solution.

When the high-temperature storage characteristics and the high-temperature cycle characteristics of the secondary batteries of Examples 2-1 to 2-7 and Comparative Examples 2-1 and 2-2 were determined, results shown in Table 2 were obtained.

TABLE 2

| | ANODE ACTIVE MATERIAL | ELECTROLYTE SALT | SOLVENT | ACYL HALIDE KIND | CONCENTRATION (WT %) | DISCHARGE CAPACITY RETENTION RATIO (%) HIGH-TEMPERATURE STORAGE CHARACTERISTICS | HIGH-TEMPERATURE CYCLE CHARACTERISTICS |
|---|---|---|---|---|---|---|---|
| EXAMPLE 2-1 | ARTIFICIAL GRAPHITE | LiPF$_6$ 1.0 mol/kg | FEC + DEC | SUCCINYL CHLORIDE | 0.01 | 85 | 74 |
| EXAMPLE 2-2 | | | | | 0.5 | 88 | 74 |
| EXAMPLE 2-3 | | | | | 5 | 85 | 74 |
| EXAMPLE 2-4 | | | VC 1.0 WT % | | 0.5 | 90 | 82 |
| EXAMPLE 2-5 | | | VEC 1.0 WT % | | 0.5 | 88 | 80 |
| EXAMPLE 2-6 | | | — | SUCCINYL FLUORIDE | 0.5 | 88 | 76 |
| EXAMPLE 2-7 | | | — | OXALYL FLUORIDE | 0.5 | 88 | 80 |
| COMPARATIVE EXAMPLE 2-1 | ARTIFICIAL GRAPHITE | LiPF$_6$ 1.0 mol/kg | FEC + DEC | — | — | 84 | 74 |
| COMPARATIVE EXAMPLE 2-2 | | | VC 1.0 WT % | | | 85 | 82 |

As shown in Table 2, in Examples 2-1 to 2-7 in which the electrolytic solution included an acyl halide, compared to Comparative Examples 2-1 and 2-2 in which the electrolytic solution did not include an acyl halide, the discharge capacity retention ratio in at least one of the high-temperature storage characteristics and the high-temperature cycle characteristics was higher.

More specifically, the discharge capacity retention ratio in the high-temperature storage characteristics in Examples 2-1 to 2-3 was higher than that in Comparative Example 2-1, and the discharge capacity retention ratio in the high-temperature cycle characteristics in Examples 2-1 to 2-3 was equal to that in Comparative Example 1-1. In terms of the content of succinyl chloride, in Examples 2-1 to 2-3 in which the content was 0.01 wt %, 0.5 wt % or 5 wt %, only the discharge capacity retention ratio in the high-temperature storage characteristics was higher. Therefore, it was confirmed that in a secondary battery in which the anode 34 included artificial graphite as an anode active material, and the electrolytic solution included FEC and DEC as solvents, when an acyl halide was included in the electrolytic solution, the high-temperature storage characteristics or the high-temperature cycle characteristics were improved. In particular, it was confirmed that the content of an acyl halide in the electrolytic solution was preferably within a range from 0.01 wt % to 5 wt % both inclusive.

Moreover, in Examples 2-4 and 2-5 in which VC or the like was added to FEC and DEC as a solvent, compared to Example 2-2 in which only EC and DEC were included as solvents, the discharge capacity retention ratio in at least one of the high-temperature storage characteristics and the high-temperature cycle characteristics was higher. In other words, the discharge capacity retention ratio in the high-temperature storage characteristics in Example 2-5 in which VEC was added was equal to that in Example 2-2; however, the discharge capacity retention ratio in Example 2-4 in which VC was added was higher than that in Example 2-2. On the other hand, the discharge capacity retention ratio in the high-temperature cycle characteristics in Examples 2-4 and 2-5 was higher. In terms of the kind of the added solvent, the discharge capacity retention ratios in the high-temperature storage characteristics and the high-temperature cycle characteristics in Example 2-4 in which VC was added were higher than those in Example 2-5 in which VEC was added. It was also obvious from the relationship between Comparative Examples 2-1 and 2-2 that when VC was added, the discharge capacity retention ratios in the high-temperature storage characteristics and the high-temperature cycle characteristics were increased. Therefore, it was confirmed that when VC or VEC was added to FEC and DEC as a solvent, preferably VC was added, the high-temperature storage characteristics or the high-temperature cycle characteristics were further improved.

Moreover, in Example 2-6 in which succinyl fluoride was included and Example 2-7 in which oxalyl fluoride was included, compared to Example 2-2 in which succinyl chloride was included, the discharge capacity retention ratio in the high-temperature storage characteristics was equal; however, the discharge capacity retention ratio in the high-temperature cycle characteristics was higher. Therefore, it was confirmed that as an acyl halide, a fluoride is more preferable than a chloride.

In particular, in Examples 2-1 to 2-7 in which the solvent included FEC, compared to Examples 1-1 to 1-5, 1-8 and 1-9 (refer to Table 1) in which the solvent included EC, the discharge capacity retention ratio in at least one of the high-temperature storage characteristics and the high-temperature cycle characteristics was higher. Therefore, it was confirmed that FEC was more preferable than EC as a solvent.

Examples 3-1 to 3-4

Secondary batteries were formed by the same steps as those in Examples 1-2, 1-4, 1-5 and 1-8, except that as a solvent, 4,5-difluoro-1,3-dioxolane-2-one (DFEC) was further added. At that time, the composition of the mixture solvent was EC:DFEC:DEC=2:1:7 as a weight ratio.

Example 3-5

A secondary battery was formed by the same steps as those in Example 3-1, except that instead of DFEC, bis(fluoromethyl) carbonate (BFMC) was used as a solvent. At that time, the composition of the mixture solvent was EC:BFMC:DEC=2:1:7 as a weight ratio.

Example 3-6

A secondary battery was formed by the same steps as those in Example 3-1, except that instead of succinyl chloride, oxalyl fluoride was included.

Comparative Examples 3-1, 3-2

Secondary batteries were formed by the same steps as those in Examples 3-1 and 3-2, except that succinyl chloride was not included in the electrolytic solution.

When the high-temperature storage characteristics and the high-temperature cycle characteristics of the secondary batteries of Examples 3-1 to 3-6 and Comparative Examples 3-1 and 3-2 were determined, results shown in Table 3 were obtained.

TABLE 3

| | ANODE ACTIVE MATERIAL | ELECTROLYTE SALT | SOLVENT | | ACYL HALIDE | | DISCHARGE CAPACITY RETENTION RATIO (%) | |
|---|---|---|---|---|---|---|---|---|
| | | | | | KIND | CONCENTRATION (WT %) | HIGH-TEMPERATURE STORAGE CHARACTERISTICS | HIGH-TEMPERATURE CYCLE CHARACTERISTICS |
| EXAMPLE 3-1 | ARTIFICIAL GRAPHITE | $LiPF_6$ 1.0 mol/kg | EC + DFEC + DEC | — | SUCCINYL CHLORIDE | 0.5 | 88 | 79 |
| EXAMPLE 3-2 | | | | VC 1.0 WT % | | | 89 | 83 |
| EXAMPLE 3-3 | | | | VEC 1.0 WT % | | | 88 | 82 |
| EXAMPLE 3-4 | | | | — | SUCCINYL FLUORIDE | | 89 | 83 |
| EXAMPLE 3-5 | | | EC + BFMC + DEC | — | SUCCINYL CHLORIDE | 0.5 | 86 | 75 |

TABLE 3-continued

| | ANODE ACTIVE MATERIAL | ELECTROLYTE SALT | SOLVENT | ACYL HALIDE KIND | ACYL HALIDE CONCENTRATION (WT %) | DISCHARGE CAPACITY RETENTION RATIO (%) HIGH-TEMPERATURE STORAGE CHARACTERISTICS | DISCHARGE CAPACITY RETENTION RATIO (%) HIGH-TEMPERATURE CYCLE CHARACTERISTICS |
|---|---|---|---|---|---|---|---|
| EXAMPLE 3-6 | | | EC + DFEC + DEC | OXALYL FLUORIDE | 0.5 | 89 | 85 |
| COMPARATIVE EXAMPLE 3-1 | ARTIFICIAL GRAPHITE | LiPF$_6$ 1.0 mol/kg | EC + DFEC + DEC | ☐ | ☐ | 85 | 74 |
| COMPARATIVE EXAMPLE 3-2 | | | | VC 1.0 WT % | | 87 | 82 |

As shown in Table 3, in Examples 3-1 to 3-6 in which the electrolytic solution included an acyl halide, compared to Comparative Examples 3-1 and 3-2 in which the electrolytic solution did not include an acyl halide, the discharge capacity retention ratios in the high-temperature storage characteristics and the high-temperature cycle characteristics were higher.

More specifically, the discharge capacity retention ratios in the high-temperature storage characteristics and the high-temperature cycle characteristics in Example 3-1 were higher than those in Comparative Example 3-1. Therefore, it was confirmed that in a secondary battery in which the anode 34 included artificial graphite as an anode active material, and the electrolytic solution included EC, DFEC and DEC as solvents, when an acyl halide was included in the electrolytic solution, the high-temperature storage characteristics or the high-temperature cycle characteristics were improved.

Moreover, in Examples 3-2 and 3-3 in which as a solvent, VC or the like was added to EC, DFEC and DEC, compared to Example 3-1 in which only EC, DFEC and DEC were included as solvents, the discharge capacity retention ratio in at least one of the high-temperature storage characteristics and the high-temperature cycle characteristics was higher. In other words, only in Example 3-3 in which VEC was added, the discharge capacity retention ratio in the high-temperature storage characteristics was equal to that in Example 3-1; however, the discharge capacity retention ratio in Example 3-2 in which VC was added was higher than that in Example 3-1. On the other hand, the discharge capacity retention ratio in the high-temperature cycle characteristics in Examples 3-2 and 3-3 was higher. In terms of the kind of the added solvent, the discharge capacity retention ratios in the high-temperature storage characteristics and the high-temperature cycle characteristics in Example 3-2 in which VC was added were higher than those in Example 3-3 in which VEC was added. It was also obvious from the relationship between Comparative Examples 3-1 and 3-3 that when VC was added, the discharge capacity retention ratios in the high-temperature storage characteristics and the high-temperature cycle characteristics were increased. Therefore, it was confirmed that when VC or VEC was added to EC, DFEC and DEC as a solvent, preferably when VC was added, the high-temperature storage characteristics or the high-temperature cycle characteristics were further improved.

Moreover, in Example 3-4 in which succinyl fluoride was included and Example 3-6 in which oxalyl fluoride was included, compared to Example 3-1 in which succinyl chloride was included, the discharge capacity retention ratios in the high-temperature storage characteristics and the high-temperature cycle characteristics were higher. Therefore, it was confirmed that as an acyl halide, a fluoride was more preferable than a chloride.

Further, in Example 3-5 in which the solvent included BFMC, compared to Example 1-2 (refer to Table 1) in which the solvent did not include BFMC, the discharge capacity retention ratio in at least one of the high-temperature storage characteristics and the high-temperature cycle characteristics was higher. Moreover, in Example 3-5 in which EC, BFMC and DEC were included as solvents, the discharge capacity retention ratios in the high-temperature storage characteristics and the high-temperature cycle characteristics were lower than those in Example 3-1 in which EC, DFEC and DEC were included as solvents; however, they were higher than those in Comparative Example 3-1. Therefore, it was confirmed that when BFMC was further added as a solvent, or when BFMC was used as a solvent instead of DFEC, the high-temperature storage characteristics or high-temperature cycle characteristics were improved.

In particular, in Examples 3-1 to 3-4 and 3-6 in which the solvent included DFEC, compared to Examples 2-2 and 2-4 to 2-7 (refer to Table 2) in which the solvent included FEC, the discharge capacity retention ratio in at least one of the high-temperature storage characteristics and the high-temperature cycle characteristics was higher. Therefore, it was confirmed that as the solvent, DFEC was more preferable than FEC.

Example 4-1

A secondary battery was formed by the same steps as those in Example 1-2, except that as the electrolyte salt, difluoro[oxalate-O,O']lithium borate was further added, and the concentrations of LiFP$_6$ and difluoro[oxalate-O,O']lithium borate in the electrolytic solution were 0.9 mol/kg and 0.1 mol/kg, respectively.

Example 4-2

A secondary battery was formed by the same steps as those in Example 4-1, except that as the electrolyte salt, instead of difluoro[oxalate-O,O']lithium borate, bis[oxalate-O,O']lithium borate was added.

Example 4-3

A secondary battery was formed by the same steps as those in Example 4-1, except that as the electrolyte salt, instead of difluoro[oxalate-O,O']lithium borate, lithium 1,3-perfluoropropanedisulfonylimide was added.

Example 4-4

A secondary battery was formed by the same steps as those in Example 4-1, except that as the electrolyte salt, bis[oxalate-O,O']lithium borate was further added, and the concentrations of difluoro[oxalate-O,O']lithium borate and bis[oxalate-O,O']lithium borate each were 0.05 mol/kg.

Example 4-5

A secondary battery was formed by the same steps as those in Example 4-1, except that as the electrolyte salt, instead of difluoro[oxalate-O,O']lithium borate, $LiBF_4$ was added.

Comparative Example 4

A secondary battery was formed by the same steps as those in Example 4-1, except that succinyl chloride was not included in the electrolytic solution.

When the high-temperature storage characteristics and the high-temperature cycle characteristics of the secondary batteries of Examples 4-1 to 4-5 and Comparative Example 4 were determined, results shown in Table 4 were obtained.

In terms of the number of added electrolyte salts, in Examples 4-1 to 4-3 and 4-5 in which one kind of electrolyte salt was added to $LiPF_6$, the discharge capacity retention ratios in the high-temperature storage characteristics and the high-temperature cycle characteristics were substantially the same; however, in Example 4-4 in which two kinds of electrolyte salts were added to $LiPF_6$, the discharge capacity retention ratios in the high-temperature storage characteristics and the high-temperature cycle characteristics were higher than those in Examples 4-1 to 4-3 and 4-5. Therefore, it was confirmed that when two or more kinds of electrolyte salts were added to the $LiPF_6$, the high-temperature storage characteristics or the high-temperature cycle characteristics were further improved.

In particular, in Examples 4-1 to 4-5 in which another electrolyte salt was included together with $LiPF_6$, compared to Example 1-2 (refer to Table 1) in which only $LiPF_6$ was included as the electrolyte salt, the discharge capacity retention ratios in the high-temperature storage characteristics and the high-temperature cycle characteristics were higher. Therefore, it was confirmed that in the case where $LiPF_6$ was used as the electrolyte salt, another electrolyte salt contributing improvement in the high-temperature storage characteristics or the high-temperature cycle characteristics was preferably mixed and used.

TABLE 4

| | ANODE ACTIVE MATERIAL | ELECTROLYTE SALT | | SOLVENT | ACYL HALIDE | | DISCHARGE CAPACITY RETENTION RATIO (%) | |
|---|---|---|---|---|---|---|---|---|
| | | | | | KIND | CONCENTRATION (WT %) | HIGH-TEMPERATURE STORAGE CHARACTERISTICS | HIGH-TEMPERATURE CYCLE CHARACTERISTICS |
| EXAMPLE 4-1 | ARTIFICIAL GRAPHITE | $LiPF_6$ 0.9 mol/kg | difluoro[oxalate-O,O'] lithium borate 0.1 mol/kg | EC + DEC | SUCCINYL CHLORIDE | 0.5 | 86 | 78 |
| EXAMPLE 4-2 | | | bis[oxalate-O,O'] lithium borate 0.1 mol/kg | | | | 89 | 78 |
| EXAMPLE 4-3 | | | lithium 1,3-perfluoropanedisulfonylimide 0.1 mol/kg | | | | 87 | 75 |
| EXAMPLE 4-4 | | | difluoro[oxalate-O,O'] lithium borate 0.05 mol/kg + bis[oxalate-O,O'] lithium borate 0.05 mol/kg | | | | 90 | 79 |
| EXAMPLE 4-5 | | | $LiBF_4$ 0.1 mol/kg | | | | 88 | 78 |
| COMPARATIVE EXAMPLE 4 | ARTIFICIAL GRAPHITE | $LiPF_6$ 0.9 mol/kg | difluoro[oxalate-O,O'] lithium borate 0.1 mol/kg | EC + DEC | — | — | 82 | 72 |

As shown in Table 4, in Examples 4-1 to 4-5 in which the electrolytic solution included an acyl halide, compared to Comparative Example 4 in which the electrolytic solution did not include an acyl halide, the discharge capacity retention ratios in the high-temperature storage characteristics and the high-temperature cycle characteristics were higher. Therefore, it was confirmed that in a secondary battery in which the anode 34 included artificial graphite as an anode active material, and the electrolyte solution included $LiPF_6$ as the electrolyte salt, when succinyl chloride was included in the electrolytic solution, the high-temperature storage characteristics or the high-temperature cycle characteristics were improved.

(2) Metal-Based Anode

Secondly, laminate film type secondary batteries shown in FIGS. 3 and 4 were manufactured using lithium metal as an anode active material. The secondary batteries were lithium metal secondary batteries in which the capacity of the anode 34 was represented by a capacity component based on precipitation and dissolution of lithium.

Examples 5-1 to 5-9

Secondary batteries were formed by the same steps as those in Examples 1-1 to 1-9, except that instead of applying the anode mixture slurry to both sides of the anode current collector 34A, lithium metal (with a thickness of 30 Mm) was adhered to form the anode active material layer 34B.

Comparative Examples 5-1, 5-2

Secondary batteries were formed by the same steps as those in Examples 5-2 and 5-4, except that succinyl chloride was not included in the electrolytic solution.

When the high-temperature storage characteristics and the high-temperature cycle characteristics of the secondary batteries of Examples 5-1 and 5-9 and Comparative Examples 5-1 and 5-2 were determined, results shown in Table 5 were obtained.

Moreover, in Examples 5-4 to 5-7, compared to Example 5-2, the discharge capacity retention ratios in the high-temperature storage characteristics and the high-temperature cycle characteristics were higher. Therefore, it was confirmed that when VC, VEC, SCAH or PRS was added to EC and DEC as a solvent, the high-temperature storage characteristics or the high-temperature cycle characteristics were further improved, and in particular, as the solvent to be added, VEC was preferable, and VC was more preferable.

Further, in Examples 5-8 and 5-9, compared to Example 5-2, the discharge capacity retention ratio in at least one of the high-temperature storage characteristics and the high-tem-

TABLE 5

| | | | | ACYL HALIDE | | DISCHARGE CAPACITY RETENTION RATIO (%) | |
|---|---|---|---|---|---|---|---|
| | ANODE ACTIVE MATERIAL | ELECTROLYTE SALT | SOL-VENT | KIND | CONCEN-TRATION (WT %) | HIGH-TEMPERATURE STORAGE CHARACTER-ISTICS | HIGH-TEMPERATURE CYCLE CHARACTER-ISTICS |
| EXAMPLE 5-1 | LITHIUM | LiPF$_6$ | EC + | SUCCINYL | 0.01 | 82 | 55 |
| EXAMPLE 5-2 | METAL | 1.0 mol/kg | DEC | CHLORIDE | 0.5 | 87 | 64 |
| EXAMPLE 5-3 | | | | | 5 | 88 | 60 |
| EXAMPLE 5-4 | | | VC 1.0 WT % | | 0.5 | 89 | 68 |
| EXAMPLE 5-5 | | | VEC 1.0 WT % | | 0.5 | 88 | 67 |
| EXAMPLE 5-6 | | | SCAH 1.0 WT % | | 0.5 | 88 | 65 |
| EXAMPLE 5-7 | | | PRS 1.0 WT % | | 0.5 | 88 | 65 |
| EXAMPLE 5-8 | | | — | SUCCINYL FLUORIDE | 0.5 | 87 | 67 |
| EXAMPLE 5-9 | | | — | OXALYL FLUORIDE | 0.5 | 89 | 68 |
| COMPARATIVE EXAMPLE 5-1 | LITHIUM METAL | LiPF$_6$ 1.0 mol/kg | EC + DEC | — | — | 80 | 56 |
| COMPARATIVE EXAMPLE 5-2 | | | VC 1.0 WT % | | | 81 | 65 |

As shown in Table 5, in Examples 5-1 to 5-9 in which the electrolytic solution included an acyl halide, compared to Comparative Examples 5-1 and 5-2 in which the electrolytic solution did not include an acyl halide, substantially the same tendency as in the case of the description about the results in Table 1 was observed.

In other words, in Examples 5-1 to 5-3, compared to Comparative Example 5-1, the discharge capacity retention ratio in at least one of the high-temperature storage characteristics and the high-temperature cycle characteristics was higher. Therefore, it was confirmed that in a secondary battery in which the anode 34 included lithium metal as the anode active material, and the electrolytic solution included EC and DEC as solvents, when an acyl halide was included in the electrolytic solution, the high-temperature storage characteristics or the high-temperature cycle characteristics were improved, and in particular, the content of an acyl halide in the electrolytic solution was preferably within a range from 0.01 wt % to 5 wt % both inclusive, and more preferably within a range from 0.5 wt % to 5 wt % both inclusive.

perature cycle characteristics was higher. Therefore, it was confirmed that as an acyl halide, a fluoride was more preferable than a chloride.

Examples 6-1 to 6-7

Secondary batteries were formed by the same steps as those in Examples 2-1 to 2-7, except that the anode active material layer 34B was formed by the steps described in Examples 5-1 to 5-9.

Comparative Examples 6-1, 6-2

Secondary batteries were formed by the same steps as those in Examples 6-2 and 6-4, except that succinyl chloride was not included in the electrolytic solution.

When the high-temperature storage characteristics and the high-temperature cycle characteristics of the secondary batteries of Examples 6-1 to 6-7 and Comparative Examples 6-1 and 6-2 were determined, results shown in Table 6 were obtained.

TABLE 6

| | ANODE ACTIVE MATERIAL | ELECTROLYTE SALT | SOLVENT | ACYL HALIDE KIND | CONCENTRATION (WT %) | HIGH-TEMPERATURE STORAGE CHARACTERISTICS | HIGH-TEMPERATURE CYCLE CHARACTERISTICS |
|---|---|---|---|---|---|---|---|
| EXAMPLE 6-1 | LITHIUM METAL | LiPF$_6$ 1.0 mol/kg | FEC + DEC — | SUCCINYL CHLORIDE | 0.01 | 87 | 68 |
| EXAMPLE 6-2 | | | — | | 0.5 | 88 | 74 |
| EXAMPLE 6-3 | | | — | | 5 | 88 | 71 |
| EXAMPLE 6-4 | | | VC 1.0 WT % | | 0.5 | 89 | 76 |
| EXAMPLE 6-5 | | | VEC 1.0 WT % | | 0.5 | 90 | 77 |
| EXAMPLE 6-6 | | | — | SUCCINYL FLUORIDE | 0.5 | 89 | 75 |
| EXAMPLE 6-7 | | | — | OXALYL FLUORIDE | 0.5 | 89 | 77 |
| COMPARATIVE EXAMPLE 6-1 | LITHIUM METAL | LiPF$_6$ 1.0 mol/kg | FEC + DEC — | — | — | 84 | 70 |
| COMPARATIVE EXAMPLE 6-2 | | | VC 1.0 WT % | | | 85 | 71 |

As shown in Table 6, in Examples 6-1 to 6-7 in which the electrolytic solution included an acyl halide, compared to Comparative Examples 6-1 and 6-2 in which the electrolytic solution did not include an acyl halide, substantially the same tendency as in the case of the description about the results in Table 2 was observed.

In other words, in Examples 6-1 to 6-3, compared to Comparative Example 6-1, the discharge capacity retention ratio in at least one of the high-temperature storage characteristics and the high-temperature cycle characteristics was higher. Therefore, it was confirmed that in a secondary battery in which the anode 34 included lithium metal as the anode active material, and the electrolytic solution included FEC and DEC as solvents, when an acyl halide was included in the electrolytic solution, the high-temperature storage characteristics or the high-temperature cycle characteristics were improved, and in particular, the content of an acyl halide in the electrolytic solution was preferably within a range from 0.01 wt % to 5 wt % both inclusive, and more preferably within a range from 0.5 wt % to 5 wt % both inclusive.

Moreover, in Examples 6-4 and 6-5, compared to Example 6-2, the discharge capacity retention ratios in the high-temperature storage characteristics and the high-temperature cycle characteristics were higher. Therefore, it was confirmed that when VC or VEC was added to EC and DEC as a solvent, the high-temperature storage characteristics or the high-temperature cycle characteristics were further improved.

Further, in Examples 6-6 and 6-7, compared to Example 6-2, the discharge capacity retention ratios in the high-temperature storage characteristics and the high-temperature cycle characteristics were higher. Therefore, it was confirmed that as an acyl halide, a fluoride was more preferable than a chloride.

In particular, in Examples 6-1 to 6-7, compared to Examples 5-1 to 5-5, 5-8 and 5-9 (refer to Table 5), the discharge capacity retention ratio in at least one of the high-temperature storage characteristics and the high-temperature cycle characteristics was higher. Therefore, it was confirmed that as the solvent, FEC was more preferable than EC.

Examples 7-1 to 7-6

Secondary batteries were formed by the same steps as those in Examples 3-1 to 3-6, except that the anode active material layer 34B was formed by the steps described in Examples 5-1 to 5-9.

Comparative Examples 7-1, 7-2

Secondary batteries were formed by the same steps as those in Examples 7-1 and 7-2, except that succinyl chloride was not included in the electrolytic solution.

When the high-temperature storage characteristics and the high-temperature cycle characteristics of the secondary batteries of Examples 7-1 to 7-6 and Comparative Examples 7-1 and 7-2 were determined, results shown in Table 7 were obtained.

TABLE 7

| | ANODE ACTIVE MATERIAL | ELECTROLYTE SALT | SOLVENT | | ACYL HALIDE | | DISCHARGE CAPACITY RETENTION RATIO (%) | |
|---|---|---|---|---|---|---|---|---|
| | | | | | KIND | CONCENTRATION (WT %) | HIGH-TEMPERATURE STORAGE CHARACTERISTICS | HIGH-TEMPERATURE CYCLE CHARACTERISTICS |
| EXAMPLE 7-1 | LITHIUM METAL | LiPF$_6$ 1.0 mol/kg | EC + DFEC + DEC | — | SUCCINYL CHLORIDE | 0.5 | 88 | 76 |
| EXAMPLE 7-2 | | | | VC 1.0 WT % | SUCCINYL CHLORIDE | | 91 | 78 |
| EXAMPLE 7-3 | | | | VEC 1.0 WT % | | | 87 | 76 |
| EXAMPLE 7-4 | | | | — | SUCCINYL FLUORIDE | | 87 | 79 |
| EXAMPLE 7-5 | | | EC + BFMC + DEC | — | SUCCINYL CHLORIDE | 0.5 | 85 | 75 |
| EXAMPLE 7-6 | | | EC + DFEC + DEC | — | OXALYL FLUORIDE | 0.5 | 89 | 79 |
| COMPARATIVE EXAMPLE 7-1 | LITHIUM METAL | LiPF$_6$ 1.0 mol/kg | EC + DFEC + DEC | — | — | — | 85 | 72 |
| COMPARATIVE EXAMPLE 7-2 | | | | VC 1.0 WT % | | | 86 | 73 |

As shown in Table 7, in Examples 7-1 to 7-6 in which the electrolytic solution included an acyl halide, compared to Comparative Examples 7-1 and 7-2 in which the electrolytic solution did not include an acyl halide, substantially the same tendency as in the case of the description about the results in Table 3 was observed.

In other words, in Example 7-1, compared to Comparative Example 7-1, the discharge capacity retention ratios in the high-temperature storage characteristics and the high-temperature cycle characteristics were higher. Therefore, it was confirmed that in a secondary battery in which the anode 34 included lithium metal as the anode active material, and the electrolytic solution included EC, DFEC and DEC as the solvents, when an acyl halide was included in the electrolytic solution, the high-temperature storage characteristics or the high-temperature cycle characteristics were improved.

Moreover, in Examples 7-2 and 7-3, compared to Example 7-1, the discharge capacity retention ratio in at least one of the high-temperature storage characteristics and the high-temperature cycle characteristics was higher. Therefore, it was confirmed that when VC or VEC was added to EC, DFEC and DEC as a solvent, the high-temperature storage characteristics or the high-temperature cycle characteristics were further improved, and in particular, as the solvent to be added, VEC was preferable. Therefore, to improve the high-temperature storage characteristics or the high-temperature cycle characteristics, VEC was preferable, and VC was more preferable.

Further, in Examples 7-4 and 7-6, compared to Example 7-1, the discharge capacity retention ratio in at least one of the high-temperature storage characteristics and the high-temperature cycle characteristics was higher. Therefore, it was confirmed that as an acyl halide, a fluoride was more preferable than a chloride.

Moreover, in Example 7-5, compared to Example 5-2 (refer to Table 5), the discharge capacity retention ratio in at least one of the high-temperature storage characteristics and the high-temperature cycle characteristics was higher. Further, in Example 7-5, the discharge capacity retention ratios in the high-temperature storage characteristics and the high-temperature cycle characteristics were lower than those in Example 7-1; however, the discharge capacity retention ratio in at least one of the high-temperature storage characteristics and the high-temperature cycle characteristics in Example 7-5 was higher than that in Comparative Example 7-1. Therefore, it was confirmed that in the case where instead of DFEC, BFMC was used as a solvent, the high-temperature storage characteristics or the high-temperature cycle characteristics were improved.

In particular, in Examples 7-1 to 7-4 and 7-6, the discharge capacity retention ratio in at least one of the high-temperature storage characteristics and the high-temperature cycle characteristics was higher than that in Examples 6-2, 6-4 to 6-7 (refer to Table 6). Therefore, it was confirmed that as the solvent, DFEC was more preferable than FEC.

Examples 8-1 to 8-5

Secondary batteries were formed by the same steps as those in Examples 4-1 to 4-5, except that the anode active material layer 34B was formed by the steps described in Examples 5-1 to 5-9.

Comparative Example 8

A secondary battery was formed by the same steps as those in Example 8-1, except that succinyl chloride was not included in the electrolytic solution.

When the high-temperature storage characteristics and the high-temperature cycle characteristics of the secondary batteries of Examples 8-1 to 8-5 and Comparative Example 8 were determined, results shown in Table 8 were obtained.

TABLE 8

| | ANODE ACTIVE MATERIAL | ELECTROLYTE SALT | | SOL-VENT | ACYL HALIDE | | DISCHARGE CAPACITY RETENTION RATIO (%) | |
|---|---|---|---|---|---|---|---|---|
| | | | | | KIND | CONCEN-TRATION (WT %) | HIGH-TEMPERATURE STORAGE CHARACTER-ISTICS | HIGH-TEMPERATURE CYCLE CHARACTER-ISTICS |
| EXAMPLE 8-1 | LITHIUM METAL | LiPF$_6$ 0.9 mol/kg | difluoro[oxalate-O,O'] lithium borate 0.1 mol/kg | EC + DEC | SUCCINYL CHLORIDE | 0.5 | 87 | 78 |
| EXAMPLE 8-2 | | | bis[oxalate-O,O'] lithium borate 0.1 mol/kg | | | | 88 | 83 |
| EXAMPLE 8-3 | | | lithium 1,3-perfluoropropanedisulfonylimide 0.1 mol/kg | | | | 87 | 77 |
| EXAMPLE 8-4 | | | difluoro[oxalate-O,O'] lithium borate 0.05 mol/kg + bis[oxalate-O,O'] lithium borate 0.05 mol/kg | | | | 89 | 80 |
| EXAMPLE 8-5 | | | LiBF$_4$ 0.1 mol/kg | | | | 87 | 78 |
| COMPARATIVE EXAMPLE 8 | LITHIUM METAL | LiPF$_6$ 0.9 mol/kg | difluoro[oxalate-O,O'] lithium borate 0.1 mol/kg | EC + DEC | — | — | 85 | 77 |

As shown in Table 8, in Examples 8-1 to 8-5 in which the electrolytic solution included an acyl halide, compared to Comparative Example 8 in which the electrolytic solution did not include an acyl halide, substantially the same tendency as in the case of the description about the results in Table 4 was observed.

In other words, in Examples 8-1 to 8-5, compared to Comparative Example 8, the discharge capacity retention ratio in at least one of the high-temperature storage characteristics and the high-temperature cycle characteristics was higher. Therefore, it was confirmed that in a secondary battery in which the anode 34 included lithium metal as the anode active material, and the electrolytic solution included LiPF$_6$ as the electrolyte salt, when an acyl halide was included in the electrolytic solution, the high-temperature storage characteristics or the high-temperature cycle characteristics were improved, and in particular, a mixture of two or more kinds of electrolyte salts including LiPF$_6$ was preferably used.

(3) Non-Metal-Based Anode

Thirdly, laminate film type secondary batteries shown in FIGS. 3 and 4 were manufactured using silicon as an anode active material. At that time, the secondary batteries were lithium-ion secondary batteries in which the capacity of the anode 34 was represented by a capacity component based on insertion and extraction of lithium.

Examples 9-1 to 9-9

Secondary batteries were formed by the same steps as those in Examples 1-1 to 1-9, except that instead of applying the anode mixture slurry on both sides of the anode current collector 34A, silicon was evaporated through the use of an electron beam evaporation method.

Examples 9-10, 9-11

Secondary batteries were formed by the same steps as those in Example 9-9, except that the content of oxalyl fluoride was 1 wt % (in Example 9-10) and 5 wt % (in Example 9-11).

Comparative Examples 9-1, 9-2

Secondary batteries were formed by the same steps as those in Examples 9-2 and 9-4, except that succinyl chloride was not included in the electrolytic solution.

Comparative Example 9-3

A secondary battery was formed by the same steps as those in Example 9-2, except that instead of an acyl halide (succinyl chloride), a sulfonyl halide (propane-1,3-bis(sulfonylfluoride): PBSF) was included. At that time, the content of PBSF was 0.5 wt %.

When the high-temperature storage characteristics and the high-temperature cycle characteristics of the secondary batteries of Examples 9-1 to 9-11 and Comparative Examples 9-1 to 9-3 were determined, results shown in Table 9 were obtained.

TABLE 9

| | ANODE ACTIVE MATERIAL | ELECTROLYTE SALT | SOLVENT | ACYL HALIDE KIND | ACYL HALIDE CONCENTRATION (WT %) | DISCHARGE CAPACITY RETENTION RATIO (%) HIGH-TEMPERATURE STORAGE CHARACTERISTICS | DISCHARGE CAPACITY RETENTION RATIO (%) HIGH-TEMPERATURE CYCLE CHARACTERISTICS |
|---|---|---|---|---|---|---|---|
| EXAMPLE 9-1 | SILICON | LiPF$_6$ 1.0 mol/kg | EC + DEC | SUCCINYL CHLORIDE | 0.01 | 72 | 64 |
| EXAMPLE 9-2 | | | | | 0.5 | 78 | 70 |
| EXAMPLE 9-3 | | | | | 5 | 78 | 66 |
| EXAMPLE 9-4 | | | VC 1.0 WT % | | 0.5 | 79 | 72 |
| EXAMPLE 9-5 | | | VEC 1.0 WT % | | 0.5 | 80 | 71 |
| EXAMPLE 9-6 | | | SCAH 1.0 WT % | | 0.5 | 81 | 71 |
| EXAMPLE 9-7 | | | PRS 1.0 WT % | | 0.5 | 80 | 70 |
| EXAMPLE 9-8 | | | — | SUCCINYL FLUORIDE | 0.5 | 79 | 71 |
| EXAMPLE 9-9 | | | — | OXALYL FLUORIDE | 0.5 | 79 | 74 |
| EXAMPLE 9-10 | | | — | | 1 | 78 | 77 |
| EXAMPLE 9-11 | | | — | | 5 | 73 | 85 |
| COMPARATIVE EXAMPLE 9-1 | SILICON | LiPF$_6$ 1.0 mol/kg | EC + DEC | — | — | 70 | 65 |
| COMPARATIVE EXAMPLE 9-2 | | | VC 1.0 WT % | | | 72 | 70 |
| COMPARATIVE EXAMPLE 9-3 | | | PBSF 0.5 WT % | — | — | 77 | 69 |

As shown in Table 9, in Examples 9-1 to 9-11 in which the electrolytic solution included an acyl halide, compared to Comparative Examples 9-1 to 9-3 in which the electrolytic solution did not include an acyl halide, substantially the same tendency as in the case of the description about the results in Table 1 was observed.

In other words, in Examples 9-1 to 9-3, compared to Comparative Example 9-1, the discharge capacity retention ratio in at least one of the high-temperature storage characteristics and the high-temperature cycle characteristics was higher. Therefore, it was confirmed that in a secondary battery in which the anode 34 included silicon as the anode active material, and the electrolytic solution included EC and DEC as solvents, when an acyl halide was included in the electrolytic solution, the high-temperature storage characteristics or the high-temperature cycle characteristics were improved, and in particular, the content of an acyl halide in the electrolytic solution was preferably within a range from 0.01 wt % to 5 wt % both inclusive, and more preferably within a range from 0.5 wt % to 5 wt % both inclusive.

Moreover, in Examples 9-4 to 9-7, compared to Example 9-2, the discharge capacity retention ratio in at least one of the high-temperature storage characteristics and the high-temperature cycle characteristics was higher. Therefore, it was confirmed that when VC, VEC, SCAH or PRS was added as a solvent, the high-temperature storage characteristics or the high-temperature cycle characteristics were further improved.

Further, in Examples 9-8 to 9-11, compared to Example 9-1, the discharge capacity retention ratios in the high-temperature storage characteristics and the high-temperature cycle characteristics were higher, and in Examples 9-8 and 9-9, compared to Example 9-2, the discharge capacity retention ratios in the high-temperature storage characteristics and the high-temperature cycle characteristics were higher. In particular, in Examples 9-2, 9-8 and 9-9 in which the electrolytic solution included an acyl halide, compared to Comparative Example 9-3 in which the electrolytic solution included a sulfonyl halide, the discharge capacity retention ratios in the high-temperature storage characteristics and the high-temperature cycle characteristics were higher. Therefore, to improve the high-temperature storage characteristics or the high-temperature cycle characteristics, it was confirmed that an acyl halide is more advantageous than a sulfonyl halide, and as an acyl halide, a fluoride was more preferable than a chloride.

Examples 10-1 to 10-7

Secondary batteries were formed by the same steps as those in Examples 2-1 to 2-7, except that the anode active material layer 34B was formed by the steps described in Examples 9-1 to 9-11.

Example 10-8

A secondary battery was formed by the same steps as those in Example 10-7, except that the content of oxalyl fluoride in the electrolytic solution was 5 wt %.

Comparative Examples 10-1, 10-2

Secondary batteries were formed by the same steps as those in Examples 10-2 and 10-4, except that succinyl chloride was not included in the electrolytic solution.

When the high-temperature storage characteristics and the high-temperature cycle characteristics of the secondary batteries of Examples 10-1 to 10-8 and Comparative Examples 10-1 and 10-2 were determined, results shown in Table 10 were obtained.

TABLE 10

| | ANODE ACTIVE MATERIAL | ELECTROLYTE SALT | SOL-VENT | ACYL HALIDE KIND | ACYL HALIDE CONCEN-TRATION (WT %) | DISCHARGE CAPACITY RETENTION RATIO (%) HIGH-TEMPERATURE STORAGE CHARACTER-ISTICS | DISCHARGE CAPACITY RETENTION RATIO (%) HIGH-TEMPERATURE CYCLE CHARACTER-ISTICS |
|---|---|---|---|---|---|---|---|
| EXAMPLE 10-1 | SILICON | LiPF$_6$ 1.0 mol/kg | FEC + DEC | SUCCINYL CHLORIDE | 0.01 | 78 | 71 |
| EXAMPLE 10-2 | | | | | 0.5 | 84 | 73 |
| EXAMPLE 10-3 | | | | | 5 | 85 | 75 |
| EXAMPLE 10-4 | | | VC 1.0 WT % | | 0.5 | 85 | 74 |
| EXAMPLE 10-5 | | | VEC 1.0 WT % | | 0.5 | 84 | 74 |
| EXAMPLE 10-6 | | | — | SUCCINYL FLUORIDE | 0.5 | 85 | 75 |
| EXAMPLE 10-7 | | | — | OXALYL FLUORIDE | 0.5 | 86 | 76 |
| EXAMPLE 10-8 | | | — | | 5 | 79 | 78 |
| COMPARATIVE EXAMPLE 10-1 | SILICON | LiPF$_6$ 1.0 mol/kg | FEC + DEC | — | — | 78 | 75 |
| COMPARATIVE EXAMPLE 10-2 | | | VC 1.0 WT % | | | 82 | 76 |

As shown in Table 10, in Examples 10-1 to 10-8 in which the electrolytic solution included an acyl halide, compared to Comparative Examples 10-1 and 10-2 in which the electrolytic solution did not include an acyl halide, substantially the same tendency as in the case of the description about the results in Table 2 was observed.

In other words, in Examples 10-1 to 10-3, compared to Comparative Example 10-1, the discharge capacity retention ratio in at least one of the high-temperature storage characteristics and the high-temperature cycle characteristics was equal or higher. Therefore, it was confirmed that a secondary battery in which the anode 34 included silicon as the anode active material, and the electrolytic solution included FEC and DEC as solvents, when an acyl halide was included in the electrolytic solution, the high-temperature storage characteristics or the high-temperature cycle characteristics were improved, and in particular, the content of an acyl halide in the electrolytic solution was preferably within a range from 0.01 wt % to 5 wt % both inclusive, and more preferably within a range from 0.5 wt % to 5 wt % both inclusive.

Moreover, in Examples 10-4 and 10-5, compared to Example 10-2, the discharge capacity retention ratio in at least one of the high-temperature storage characteristics and the high-temperature cycle characteristics was higher, so it was confirmed that when VC or VEC was added as a solvent, the high-temperature storage characteristics or the high-temperature cycle characteristics were further improved, and in particular, as a solvent to be added, VEC was preferable, and VC was more preferable.

Further, in Examples 10-6 to 10-8, compared to Comparative Example 10-1, the discharge capacity retention ratio in at least one of the high-temperature storage characteristics and the high-temperature cycle characteristics was higher, and in Examples 10-6 and 10-7, compared to Example 10-2, the discharge capacity retention ratios in the high-temperature storage characteristics and the high-temperature cycle characteristics were higher, so it was confirmed that as an acyl halide, a fluoride was more preferable than a chloride.

In particular, in Examples 10-1 to 10-8, compared to Examples 9-1 to 9-5, 9-8, 9-9 and 9-11 (refer to Table 9), respectively, the discharge capacity retention ratio in at least one of the high-temperature storage characteristics and the high-temperature cycle characteristics was higher, so it was confirmed that as the solvent, FEC was more preferable than EC.

Examples 11-1 to 11-6

Secondary batteries were formed by the same steps as those in Examples 3-1 to 3-6, except that the anode active material layer 34B was formed by the steps described in Examples 9-1 to 9-11.

Example 11-7

A secondary battery was formed by the same steps as those in Example 11-6, except that the content of oxalyl fluoride in the electrolytic solution was 5 wt %.

Comparative Examples 11-1, 11-2

Secondary batteries were formed by the same steps as those in Examples 11-1 and 11-2, except that succinyl chloride was not included in the electrolytic solution.

When the high-temperature storage characteristics and the high-temperature cycle characteristics of the secondary batteries of Examples 11-1 to 11-7 and Comparative Examples 11-1 and 11-2 were determined, results shown in Table 11 were obtained.

TABLE 11

| | ANODE ACTIVE MATERIAL | ELECTROLYTE SALT | SOL-VENT | | ACYL HALIDE | | DISCHARGE CAPACITY RETENTION RATIO (%) | |
|---|---|---|---|---|---|---|---|---|
| | | | | | KIND | CONCEN-TRATION (WT %) | HIGH-TEMPARATURE STORAGE CHARACTER-ISTICS | HIGH-TEMPERATURE CYCLE CHARACTER-ISTICS |
| EXAMPLE 11-1 | SILICON | LiPF$_6$ 1.0 mol/kg | EC + DFEC + DEC | — | SUCCINYL CHLORIDE | 0.5 | 87 | 78 |
| EXAMPLE 11-2 | | | | VC 1.0 WT % | | | 89 | 80 |
| EXAMPLE 11-3 | | | | VEC 1.0 WT % | | | 88 | 79 |
| EXAMPLE 11-4 | | | | — | SUCCINYL FLUORIDE | | 88 | 80 |
| EXAMPLE 11-5 | | | EC + BFMC + DEC | — | SUCCINYL CHLORIDE | 0.5 | 82 | 71 |
| EXAMPLE 11-6 | | | EC + DFEC + DEC | — | OXALYL FLUORIDE | 0.5 | 89 | 81 |
| EXAMPLE 11-7 | | | | — | | 5 | 86 | 85 |
| COMPARATIVE EXAMPLE 11-1 | SILICON | LiPF$_6$ 1.0 mol/kg | EC + DFEC + DEC | — | — | — | 84 | 78 |
| COMPARATIVE EXAMPLE 11-2 | | | | VC 1.0 WT % | | | 85 | 80 |

As shown in Table 11, in Examples 11-1 to 11-7 in which the electrolytic solution included an acyl halide, compared to Comparative Examples 11-1 and 11-2 in which the electrolytic solution did not include an acyl halide, substantially the same tendency as in the case of the description about the results in Table 3 was observed.

In other words, in Example 11-1, compared to Comparative Example 11-1, the discharge capacity retention ratio in at least one of the high-temperature storage characteristics and the high-temperature cycle characteristics was higher, so it was confirmed that in a secondary battery in which the anode 34 included silicon as the anode active material, and the electrolytic solution included EC, DFEC and DEC as the solvents, when an acyl halide was included in the electrolytic solution, the high-temperature storage characteristics or the high-temperature cycle characteristics were improved.

Moreover, in Examples 11-2 and 11-3, compared to Example 11-1, the discharge capacity retention ratios in the high-temperature storage characteristics and the high-temperature cycle characteristics were higher, so it was confirmed that when VC or VEC was added as a solvent, the high-temperature storage characteristics or the high-temperature cycle characteristics were further improved, and in particular, as a solvent to be added, VEC was preferable, and VC was more preferable.

Further, in Examples 11-4, 11-6 and 11-7, compared to Example 11-1, the discharge capacity retention ratio in at least one of the high-temperature storage characteristics and the high-temperature cycle characteristics was higher. Therefore, it was confirmed that as an acyl halide, a fluoride was more preferable tan a chloride.

Moreover, in Example 11-5, compared to Example 9-2 (refer to Table 9), the discharge capacity retention ratios in the high-temperature storage characteristics and the high-temperature cycle characteristics were higher, so it was confirmed that when BFMC was further added as a solvent, the high-temperature storage characteristics or the high-temperature cycle characteristics were improved.

In particular, in Examples 11-1 to 11-4, 11-6 and 11-7, the discharge capacity retention ratios in the high-temperature storage characteristics and the high-temperature cycle characteristics were higher than those in Examples 10-2, 10-4 to 10-8 (refer to Table 10), respectively, so it was confirmed that as the solvent, DFEC was more preferable than FEC.

Examples 12-1 to 12-5

Secondary batteries were formed by the same steps as those in Examples 4-1 to 4-5, except that the anode active material layer 34B was formed by the steps described in Examples 9-1 to 9-11.

Comparative Example 12

A secondary battery was formed by the same steps as those in Example 12-1, except that succinyl chloride was not included in the electrolytic solution.

When the high-temperature storage characteristics and the high-temperature cycle characteristics of the secondary batteries of Examples 12-1 to 12-5 and Comparative Example 12 were determined, results shown in Table 12 were obtained.

TABLE 12

| | ANODE ACTIVE MATERIAL | ELECTROLYTE SALT | SOL-VENT | ACYL HALIDE KIND | ACYL HALIDE CONCEN-TRATION (WT %) | DISCHARGE CAPACITY RETENTION RATIO (%) HIGH-TEMPARATURE STORAGE CHARACTER-ISTICS | DISCHARGE CAPACITY RETENTION RATIO (%) HIGH-TEMPERATURE CYCLE CHARACTER-ISTICS |
|---|---|---|---|---|---|---|---|
| EXAMPLE 12-1 | SILICON | $LiPF_6$ 0.9 mol/kg difluoro[oxalate-O,O'] lithium borate 0.1 mol/kg | EC + DEC | SUCCINYL CHLORIDE | 0.5 | 85 | 76 |
| EXAMPLE 12-2 | | bis[oxalate-O,O'] lithium borate 0.1 mol/kg | | | | 88 | 79 |
| EXAMPLE 12-3 | | lithium 1,3-perfluoropro-panedisulfonylimide 0.1 mol/kg | | | | 85 | 69 |
| EXAMPLE 12-4 | | difluoro[oxalate-O,O'] lithium borate 0.05 mol/kg + bis[oxalate-O,O'] lithium borate 0.05 mol/kg | | | | 89 | 80 |
| EXAMPLE 12-5 | | $LiBF_4$ 0.1 mol/kg | | | | 86 | 77 |
| COMPARATIVE EXAMPLE 12 | SILICON | $LiPF_6$ 0.9 mol/kg difluoro[oxalate-O,O'] lithium borate 0.1 mol/kg | EC + DEC | — | — | 80 | 72 |

As shown in Table 12, in Examples 12-1 to 12-5 in which the electrolytic solution included an acyl halide, compared to Comparative Example 12 in which the electrolytic solution did not include an acyl halide, substantially the same tendency as in the description about the results in Table 4 was observed.

In other words, in Examples 12-1 to 12-5, compared to Comparative Example 12, the discharge capacity retention ratios in the high-temperature storage characteristics and the high-temperature cycle characteristics were higher, so it was confirmed that in a secondary battery in which the anode 34 included silicon as the anode active material, and the electrolytic solution included $LiPF_6$ and another salt as the electrolyte salts, when an acyl halide was included in the electrolytic solution, the high-temperature storage characteristics or the high-temperature cycle characteristics were improved, and in particular, a mixture of two or more kinds of electrolyte salts including $LiPF_6$ was preferably used.

(4) Alloy-Based Anode

Fourthly, laminate film type secondary batteries shown in FIGS. 3 and 4 were manufactured using a Co—Sn alloy as an anode active material. At that time, the secondary batteries were lithium-ion secondary batteries in which the capacity of the anode 34 was represented by a capacity component based on insertion and extraction of lithium.

Examples 13-1 to 13-5

Secondary batteries were formed by the same steps as those in Examples 1-2, 1-4, 1-6, 1-7 and 1-9, except that the anode active material layer 34B was formed by the following steps. At first, the powder of the Co—Sn alloy and the powder of carbon were mixed at a predetermined ratio to form a mixture, and after dry mixing, 10 g of the mixture was put into a reaction vessel of a planetary ball mill of Ito Seisakusho together with approximately 400 g of corundums (with a diameter of 9 mm). Next, an argon atmosphere was substituted in the reaction vessel, and the cycle of a 10-minute operation step (with a rotation speed of 250 rpm) and a 10-minute interval step was repeated until the total operation time of the planetary ball mill reached 20 hours. After that, the reaction vessel was cooled down to approximately a room temperature, and the mixture was taken out from the reaction vessel, and the mixture was shifted through a sieve having 200 meshes to remove coarse grains of the mixture. Next, after 80 parts by weight of the mixture (the Co—Sn alloy) as an anode active material, 11 parts by weight of graphite and 1 part by weight of acetylene black as electrical conductors, and 8 parts by weight of PVDF as a binder were mixed to form an anode mixture, the anode mixture was dispersed in N-methyl-2-pyrrolidone as a solvent to form paste-form anode mixture slurry. Then, after the anode mixture slurry was applied to both sides of the anode current collector 34A made of strip-shaped copper foil (with a thickness of 10 Mm), and was dried, the anode mixture slurry was compression molded by a roller press to form the anode active material layer 34B.

Comparative Examples 13-1, 13-2

Secondary batteries were formed by the same steps as those in Examples 13-1 and 13-2, except that succinyl chloride was not included in the electrolytic solution.

When the high-temperature storage characteristics and the high-temperature cycle characteristics of the secondary batteries of Examples 13-1 to 13-5 and Comparative Examples 13-1 and 13-2 were determined, results shown in Table 13 were obtained.

TABLE 13

| | ANODE ACTIVE MATERIAL | ELECTROLYTE SALT | SOL-VENT | ACYL HALIDE KIND | ACYL HALIDE CONCEN-TRATION (WT %) | DISCHARGE CAPACITY RETENTION RATIO (%) HIGH-TEMPARATURE STORAGE CHARACTER-ISTICS | DISCHARGE CAPACITY RETENTION RATIO (%) HIGH-TEMPERATURE CYCLE CHARACTER-ISTICS |
|---|---|---|---|---|---|---|---|
| EXAMPLE 13-1 | Co—Sn | LiPF$_6$ 1.0 mol/kg | EC + DEC | SUCCINYL CHLORIDE | 0.5 | 82 | 63 |
| EXAMPLE 13-2 | | | VC 1.0 WT % | | | 84 | 72 |
| EXAMPLE 13-3 | | | SCAH 1.0 WT % | | | 86 | 67 |
| EXAMPLE 13-4 | | | PRS 1.0 WT % | | | 85 | 66 |
| EXAMPLE 13-5 | | | — | OXALYL FLUORIDE | 0.5 | 86 | 74 |
| COMPARATIVE EXAMPLE 13-1 | Co—Sn | LiPF$_6$ 1.0 mol/kg | EC + DEC | — | — | 76 | 65 |
| COMPARATIVE EXAMPLE 13-2 | | | VC 1.0 WT % | | | 76 | 73 |

As shown in Table 13, in Examples 13-1 to 13-5 in which the electrolytic solution included an acyl halide, compared to Comparative Examples 13-1 and 13-2 in which the electrolytic solution did not include an acyl halide, substantially the same tendency as in the case of the description about the results in Table 1 was observed.

In other words, in Example 13-1, compared to Comparative Example 13-1, the discharge capacity retention ratio in at least one of the high-temperature storage characteristics and the high-temperature cycle characteristics was higher, so it was confirmed that in a secondary battery in which the anode 34 included the Co—Sn alloy as the anode active material, and the electrolytic solution included EC and DEC as the solvents, when succinyl chloride was included in the electrolytic solution, the high-temperature storage characteristics or the high-temperature cycle characteristics were improved.

Moreover, in Examples 13-2 to 13-4, compared to Comparative Example 13-1, the discharge capacity retention ratios in the high-temperature storage characteristics and the high-temperature cycle characteristics were higher, so it was confirmed that when VC, SCAH or PRS was added as the solvent, the high-temperature storage characteristics or the high-temperature cycle characteristics were further improved.

Further, in Example 13-5, compared to Example 13-1, the discharge capacity retention ratios in the high-temperature storage characteristics and the high-temperature cycle characteristics were higher, so it was confirmed that as an acyl halide, a fluoride is more preferable than a chloride.

Examples 14-1 to 14-3

Secondary batteries were formed by the same steps as those in Examples 2-2, 2-4 and 2-7, except that the anode active material layer 34B was formed by the steps described in Examples 13-1 to 13-5.

Comparative Examples 14-1, 14-2

Secondary batteries were formed by the same steps as those in Examples 14-1 and 14-2, except that succinyl chloride was not included in the electrolytic solution.

When the high-temperature storage characteristics and the high-temperature cycle characteristics of the secondary batteries of Examples 14-1 to 14-4 and Comparative Examples 14-1 and 14-2 were determined, results shown in Table 14 were obtained.

TABLE 14

| | ANODE ACTIVE MATERIAL | ELECTROLYTE SALT | SOL-VENT | ACYL HALIDE KIND | ACYL HALIDE CONCEN-TRATION (WT %) | DISCHARGE CAPACITY RETENTION RATIO (%) HIGH-TEMPARATURE STORAGE CHARACTER-ISTICS | DISCHARGE CAPACITY RETENTION RATIO (%) HIGH-TEMPERATURE CYCLE CHARACTER-ISTICS |
|---|---|---|---|---|---|---|---|
| EXAMPLE 14-1 | Co—Sn | LiPF$_6$ 1.0 mol/kg | FEC + DEC | SUCCINYL CHLORIDE | 0.5 | 87 | 71 |
| EXAMPLE 14-2 | | | VC 1.0 WT % | | | 90 | 78 |
| EXAMPLE 14-3 | | | — | OXALYL FLUORIDE | 0.5 | 90 | 80 |
| COMPARATIVE EXAMPLE 14-1 | Co—Sn | LiPF$_6$ 1.0 mol/kg | FEC + DEC | — | — | 84 | 78 |
| COMPARATIVE EXAMPLE 14-2 | | | VC 1.0 WT % | | | 86 | 82 |

As shown in Table 14, in Examples 14-1 to 14-3 in which the electrolytic solution included an acyl halide, compared to Comparative Examples 14-1 and 14-2 in which the electrolytic solution did not include an acyl halide, substantially the same tendency as in the case of the description about the results in Table 2 was observed.

In other words, in Example 14-1, compared to Comparative Example 14-1, the discharge capacity retention ratio in at least one of the high-temperature storage characteristics and the high-temperature cycle characteristics was higher, so it was confirmed that in a secondary battery in which the anode 34 included the Co—Sn alloy as the anode active material, and the electrolytic solution included FEC and DEC as the solvents, when an acyl halide was included in the electrolytic solution, the high-temperature storage characteristics or the high-temperature cycle characteristics were improved.

Moreover, in Example 14-2, compared to Example 14-1, the discharge capacity retention ratios in the high-temperature storage characteristics and the high-temperature cycle characteristics were higher, so it was confirmed that when VC was added as the solvent, the high-temperature storage characteristics or the high-temperature cycle characteristics were further improved.

Further, in Example 14-3, compared to Example 14-1, the discharge capacity retention ratios in the high-temperature storage characteristics and the high-temperature cycle characteristics were higher, so it was confirmed that as an acyl halide, a fluoride is more preferable than a chloride.

In particular, in Examples 14-1 to 14-3, compared to Examples 13-1, 13-2 and 13-5 (refer to Table 13), respectively, the discharge capacity retention ratios in the high-temperature storage characteristics and the high-temperature cycle characteristics were higher, so it was confirmed that as the solvent, FEC was more preferable than EC.

Examples 15-1 to 15-4

Secondary batteries were formed by the same steps as those in Examples 3-1, 3-2, 3-5 and 3-6, except that the anode active material layer 34B was formed by the steps described in Examples 13-1 to 13-5.

Comparative Examples 15-1, 15-2

Secondary batteries were formed by the same steps as those in Examples 15-1 and 15-2, except that succinyl chloride was not included in the electrolytic solution.

When the high-temperature storage characteristics and the high-temperature cycle characteristics of the secondary batteries of Examples 15-1 to 15-4 and Comparative Examples 15-1 and 15-2 were determined, results shown in Table 15 were obtained.

TABLE 15

| | ANODE ACTIVE MATERIAL | ELECTROLYTE SALT | SOLVENT | ACYL HALIDE KIND | ACYL HALIDE CONCENTRATION (WT %) | DISCHARGE CAPACITY RETENTION RATIO (%) HIGH-TEMPARATURE STORAGE CHARACTERISTICS | DISCHARGE CAPACITY RETENTION RATIO (%) HIGH-TEMPERATURE CYCLE CHARACTERISTICS |
|---|---|---|---|---|---|---|---|
| EXAMPLE 15-1 | Co—Sn | LiPF$_6$ 1.0 mol/kg | EC + DFEC + DEC | SUCCINYL CHLORIDE | 0.5 | 88 | 80 |
| EXAMPLE 15-2 | | | VC 1.0 WT % | | | 89 | 82 |
| EXAMPLE 15-3 | | | EC + BFMC + DEC | | | 85 | 63 |
| EXAMPLE 15-4 | | | EC + DFEC + DEC | OXALYL FLUORIDE | 0.5 | 89 | 84 |
| COMPARATIVE EXAMPLE 15-1 | Co—Sn | LiPF$_6$ 1.0 mol/kg | EC + DFEC + DEC | — | — | 86 | 80 |
| COMPARATIVE EXAMPLE 15-2 | | | VC 1.0 WT % | | | 88 | 82 |

As shown in Table 15, in Examples 15-1 to 15-4 in which the electrolytic solution included an acyl halide, compared to Comparative Examples 15-1 and 15-2 in which the electrolytic solution did not include an acyl halide, the same tendency as in the case of the description about the results in Table 3 was observed.

In other words, in Example 15-1, compared to Comparative Example 15-1, the discharge capacity retention ratio in at least one of the high-temperature storage characteristics and the high-temperature cycle characteristics was higher, so it was confirmed that in a secondary battery in which the anode 34 included the Co—Sn alloy as the anode active material, and the electrolytic solution included EC, DFEC and DEC as the solvents, when an acyl halide was included in the electrolytic solution, the high-temperature storage characteristics or the high-temperature cycle characteristics were improved.

Moreover, in Example 15-2, compared to Example 15-1, the discharge capacity retention ratios in the high-temperature storage characteristics and the high-temperature cycle characteristics were higher, so it was confirmed that when VC was added as the solvent, the high-temperature storage characteristics or the high-temperature cycle characteristics were further improved.

Further, in Example 15-3, compared to Example 13-1 (refer to Table 13), the discharge capacity retention ratio in at least one of the high-temperature storage characteristics and the high-temperature cycle characteristics was higher, so it was confirmed that when BFMC was further added as the solvent, the high-temperature storage characteristics or the high-temperature cycle characteristics were improved.

In particular, in Example 15-4, compared to Example 15-1, the discharge capacity retention ratios in the high-temperature storage characteristics and the high-temperature cycle characteristics were higher, so it was confirmed that as an acyl halide, a fluoride was more preferable than a chloride.

Moreover, in Examples 15-1, 15-2 and 15-4, the discharge capacity retention ratio in at least one of the high-temperature storage characteristics and the high-temperature cycle characteristics was higher than that in Examples 14-1 to 14-3 (refer to Table 14), respectively, so it was confirmed that as the solvent, DFEC was more preferable than FEC.

Examples 16-1 to 16-5

Secondary batteries were formed by the same steps as those in Examples 4-1 to 4-5, except that the anode active material layer 34B was formed by the steps described in Examples 13-1 to 13-5.

Comparative Example 16

A secondary battery was formed by the same steps as those in Example 16-1, except that succinyl chloride was not included in the electrolytic solution.

When the high-temperature storage characteristics and the high-temperature cycle characteristics of the secondary batteries of Examples 16-1 to 16-5 and Comparative Example 16 were determined, results shown in Table 16 were obtained.

As shown in Table 16, in Examples 16-1 to 16-5 in which the electrolytic solution included an acyl halide, compared to Comparative Example 16 in which the electrolytic solution did not include an acyl halide, substantially the same tendency as in the case of the description about the results in Table 4 was observed.

In other words, in Examples 16-1 to 16-5, compared to Comparative Example 16, the discharge capacity retention ratio in at least one of the high-temperature storage characteristics and the high-temperature cycle characteristics was higher, so it was confirmed that in a secondary battery in which the anode 34 included the Co—Sn alloy as the anode active material, and the electrolytic solution included $LiPF_6$ and another salt as the electrolyte salts, when an acyl halide was included in the electrolytic solution, the high-temperature storage characteristics or the high-temperature cycle characteristics were improved, and in particular, a mixture of two or more kinds of electrolyte salts including $LiPF_6$ was preferably used.

As shown in the above-described results in Tables 1 to 16, it was confirmed that in the secondary battery according to the embodiment, when the electrolytic solution included an acyl halide, at least one of the high-temperature storage characteristics and the high-temperature cycle characteristics were improved independent of the kind of the anode active material or the composition of the solvent.

Although the present application is described referring to the embodiment and the examples, the application is not limited to the embodiment and the examples, and can be variously modified. For example, the electrolytic solution according to the embodiment of the application may be applied to not only a battery but also any other electrochemical device. For example, as the other electrochemical device, a capacitor and the like are cited.

Moreover, in the above-described embodiment and the above-descried examples, the case where the electrolytic solution or the gel electrolyte in which the polymer com-

TABLE 16

| | ANODE ACTIVE MATERIAL | ELECTROLYTE SALT | | SOLVENT | ACYL HALIDE KIND | ACYL HALIDE CONCENTRATION (WT %) | DISCHARGE CAPACITY RETENTION RATIO (%) HIGH-TEMPARATURE STORAGE CHARACTERISTICS | DISCHARGE CAPACITY RETENTION RATIO (%) HIGH-TEMPERATURE CYCLE CHARACTERISTICS |
|---|---|---|---|---|---|---|---|---|
| EXAMPLE 16-1 | Co—Sn | $LiPF_6$ 0.9 mol/kg | difluoro[oxalate-O,O'] lithium borate 0.1 mol/kg | EC + DEC | SUCCINYL CHLORIDE | 0.5 | 82 | 76 |
| EXAMPLE 16-2 | | | bis[oxalate-O,O'] lithium borate 0.1 mol/kg | | | | 86 | 79 |
| EXAMPLE 16-3 | | | lithium 1,3-perfluoropropanedisulfonylimide 0.1 mol/kg | | | | 85 | 66 |
| EXAMPLE 16-4 | | | difluoro[oxalate-O,O'] lithium borate 0.05 mol/kg + bis[oxalate-O,O'] lithium borate 0.05 mol/kg | | | | 88 | 77 |
| EXAMPLE 16-5 | | | $LiBF_4$ 0.1 mol/kg | | | | 85 | 75 |
| COMPARATIVE EXAMPLE 16 | Co—Sn | $LiPF_6$ 0.9 mol/kg | difluoro[oxalate-O,O'] lithium borate 0.1 mol/kg | EC + DEC | — | — | 80 | 76 | pound holds the electrolytic solution is used as the electrolyte of the secondary battery according to the embodiment of the application is described; however, any other electrolyte may be used. Examples of the other electrolyte include a mixture of an ion-conducting inorganic compound such as ion-conducting ceramic, ion-conducting glass or ionic crystal and an electrolytic solution, a mixture of another inorganic compound and an electrolytic solution, a mixture of the inorganic compound and a gel electrolyte and the like.

Moreover, in the above-described embodiment and the above-described examples, as the secondary battery according to the embodiment of the application, a lithium-ion secondary battery in which the capacity of the anode is represented by a capacity component based on insertion and extraction of lithium, or a lithium metal secondary battery in which lithium metal is used as an anode active material, and the capacity of the anode is represented by a capacity component based on precipitation and dissolution of lithium are described; however, the application is not necessarily limited to them. The secondary battery according to the embodiment of the application is applicable to a secondary battery in which the charge capacity of an anode material capable of inserting and extracting lithium is smaller than the charge capacity of a cathode, thereby the capacity of the anode includes a capacity component by insertion and extraction of lithium and a capacity component by precipitation and dissolution of lithium, and is represented by the sum of them in the same manner.

Further, in the above-described embodiment and the above-described examples, as the battery configuration of the secondary battery according to the embodiment of the application, a cylindrical type or a laminate film type is described as an example; however, the secondary battery according to the embodiment of the application is applicable to a secondary battery with any other shape such as a coin type, a button type or a prismatic type, or a secondary battery with any other configuration such as a laminate configuration in the same manner. In addition, the application is applicable to not only secondary batteries but also primary batteries in the same manner.

In addition, in the above-described embodiment and the above-described examples, the appropriate range which is derived from the results of the examples for the content of an acyl halide in the electrolytic solution according to the embodiment of the application is described; however, the description does not rule out the possibility that the content may be out of the above-described range. More specifically, the above-described appropriate range is a specifically preferable range to obtain the effects of the application, and as long as the effects of the application can be obtained, the content may be out of the range to some extent.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed as:

1. An electrolytic solution comprising:
a solvent;
an electrolyte salt; and
an acyl halide, ranging from 0.01 wt % to 5 wt % both inclusive,
wherein the acyl halide includes an acyl fluoride.

2. The electrolytic solution according to claim 1, wherein the solvent includes at least one kind selected from the group consisting of a chain carbonate and a cyclic carbonate.

3. The electrolytic solution according to claim 2, wherein the chain carbonate and the cyclic carbonate include at least one kind selected from the group consisting of a chain carbonate shown in Chemical Formula 1 which includes a halogen as an element and a cyclic carbonate shown in Chemical Formula 2 which includes a halogen as an element:

[Chemical Formula 1]

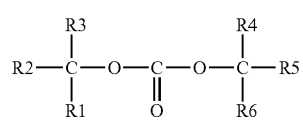

where R1 to R6 each represent a hydrogen group, a halogen group, an alkyl group or a halogenated alkyl group, and at least one of R1 to R6 includes a halogen as an element,

[Chemical Formula 2]

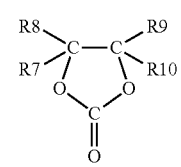

where R7 to R10 each represent a hydrogen group, a halogen group, an alkyl group or a halogenated alkyl group, and at least one of R7 to R10 includes a halogen as an element.

4. The electrolytic solution according to claim 3, wherein the chain carbonate including a halogen as an element includes at least one kind selected from the group consisting of fluoromethyl methyl carbonate, bis(fluoromethyl) carbonate and difluoromethyl methyl carbonate, and the cyclic carbonate including a halogen as an element includes at least one kind selected from the group consisting of 4-fluoro-1,3-dioxolane-2-one and 4,5-difluoro-1,3-dioxolane-2-one.

5. The electrolytic solution according to claim 2, wherein the cyclic carbonate includes a cyclic carbonate including an unsaturated bond.

6. The electrolytic solution according to claim 2, wherein the solvent further includes an acid anhydride.

7. The electrolytic solution according to claim 2, wherein the solvent further includes a compound including a sulfone bond.

8. The electrolytic solution according to claim 7, wherein the compound including a sulfone bond includes at least one kind selected from the group consisting of propane sultone, propene sultone and divinylsulfone.

9. The electrolytic solution according to claim 1, wherein the electrolyte salt includes at least one kind selected from the group consisting of lithium hexafluorophosphate, lithium tetrafluoroborate, lithium perchlorate and lithium hexafluoroarsenate.

10. The electrolytic solution according to claim 9, wherein the electrolyte salt further includes a compound shown in Chemical Formula 3:

[Chemical Formula 3]

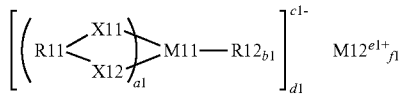

where R11 represents a —CO—R13-CO— group (R13 represents an alkylene group, a halogenated alkylene group, an arylene group or a halogenated arylene group), a —CO—C(R14)(R15)-CO— group (R14 and R15 each represent a hydrogen group, a halogen group, an alkyl group, a halogenated alkyl group, an aryl group or a halogenated aryl group) or a —CO—CO— group, R12 represents a halogen group, an alkyl group, a halogenated alkyl group, an aryl group or a halogenated aryl group, X11 and X12 each represent oxygen (O) or sulfur (S), M11 represents a transition metal element or a Group 3B element, a Group 4B element or a Group 5B element in the short form of the periodic table of the elements, M12 represents a Group 1A element or a Group 2A element in the short form of the periodic table of the elements, a1 is an integer of 1 to 4, b1 is 0 or an integer of 1 to 8, and c1 to f1 each are an integer of 1 to 3.

11. The electrolytic solution according to claim 10, wherein the compound shown in Chemical Formula 3 includes a compound shown in Chemical Formula 4:

[Chemical Formula 4]

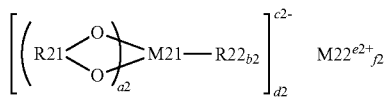

where R21 represents a —CO—R23-CO— group (R23 represents an alkylene group, a halogenated alkylene group, an arylene group or a halogenated arylene group), a —CO—C(R24)$_2$—CO— group (R24 represents a hydrogen group, a halogen group, an alkyl group, a halogenated alkyl group, a aryl group or a halogenated aryl group) or a —CO—CO— group, R22 represents a halogen group, M21 represents phosphorus (P) or boron (B), M22 represents a Group 1A element or a Group 2A element in the short form of the periodic table of the elements, a2 is an integer of 1 to 4, b2 is 0 or an integer of 2 or 4, c2 to f2 each are an integer of 1 to 3.

12. The electrolytic solution according to claim 11, wherein the compound shown in Chemical Formula 4 includes at least one kind selected from the group consisting of difluoro[oxalate-O,O']lithium borate in Chemical Formula 5(1), difluoro bis[oxalate-O,O']lithium phosphate in Chemical Formula 5(2), difluoro[3,3,3-trifluoro-2-oxide-2-trifluoromethyl propionato(2-)-O,O']lithium borate in Chemical Formula 5(3), bis[3,3,3-trifluoro-2-oxide-2-trifluoromethyl propionato(2+O,O']lithium borate in Chemical Formula 5(4), tetrafluoro[oxalate-O,O']lithium phosphate in Chemical Formula 5(5) and bis[oxalate-O,O']lithium borate in Chemical Formula 5(6):

[Chemical Formula 5]

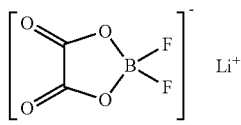 (1)

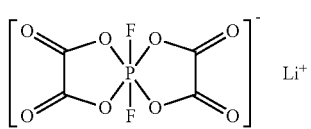 (2)

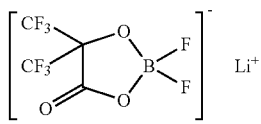 (3)

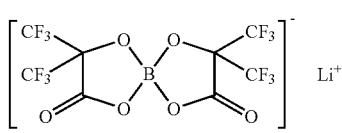 (4)

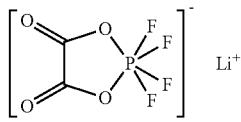 (5)

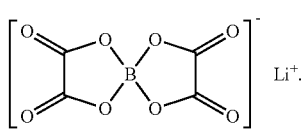 (6)

13. The electrolytic solution according to claim 9, wherein the electrolyte salt further includes at least one kind selected from the group consisting of compounds shown in Chemical Formulas 6 to 8:

LiN(C$_m$F$_{2m+1}$SO$_2$)(C$_n$F$_{2n+1}$SO$_2$)      [Chemical Formula 6]

where m and n each are an integer of 1 or more,

[Chemical Formula 7]

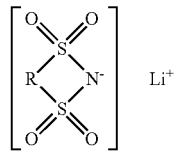

where R represents a straight-chain or branch perfluoroalkylene group having 2 to 4 carbon atoms, LiC(C$_p$F$_{2p+1}$SO$_2$)(C$_q$F$_{2q+1}$SO$_2$)(C$_r$F$_{2r+1}$SO$_2$)      [Chemical Formula 8]

where p, q and r each are an integer of 1 or more.

14. A battery comprising a cathode, an anode and an electrolytic solution,
wherein the electrolytic solution includes:
a solvent;
an electrolyte salt; and
an acyl halide, ranging from 0.01 wt % to 5 wt % both inclusive,
and
wherein the acyl halide includes an acyl fluoride.

15. The battery according to claim 14, wherein the solvent includes at least one kind selected from the group consisting of a chain carbonate and a cyclic carbonate.

16. The battery according to claim 15, wherein the chain carbonate and the cyclic carbonate include at least one kind selected from the group consisting of a chain carbonate shown in Chemical Formula 9 which includes a halogen as an element and a cyclic carbonate shown in Chemical Formula 10 which includes a halogen as an element:

[Chemical Formula 9]

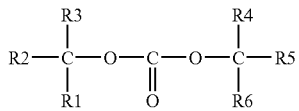

where R1 to R6 each represent a hydrogen group, a halogen group, an alkyl group or a halogenated alkyl group and at least one of R1 to R6 includes a halogen as an element,

[Chemical Formula 10]

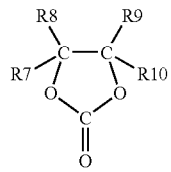

where R7 to R10 each represent a hydrogen group, a halogen group, an alkyl group or a halogenated alkyl group and at least one of R7 to R10 includes a halogen as an element.

17. The battery according to 16, wherein the chain carbonate including a halogen as an element includes at least one kind selected from the group consisting of fluoromethyl methyl carbonate, bis(fluoromethyl) carbonate and difluoromethyl methyl carbonate, and the cyclic carbonate including a halogen as an element includes at least one kind selected from the group consisting of 4-fluoro-1,3-dioxolane-2-one and 4,5-difluoro-1,3-dioxolane-2-one.

18. The battery according to claim 15, wherein the cyclic carbonate includes a cyclic carbonate including an unsaturated bond.

19. The battery according to claim 15, wherein the solvent further includes an acid anhydride.

20. The battery according to claim 15, wherein the solvent further includes a compound including a sulfone bond.

21. The battery according to claim 20, wherein the compound including a sulfone bond includes at least one kind selected from the group consisting of propane sultone, propene sultone and divinylsulfone.

22. The battery according to claim 14, wherein the electrolyte salt includes at least one kind selected from the group consisting of lithium hexafluorophosphate, lithium tetrafluoroborate, lithium perchlorate and lithium hexafluoroarsenate.

23. The battery according to claim 22, wherein the electrolyte salt further includes a compound shown in Chemical Formula 11:

[Chemical Formula 11]

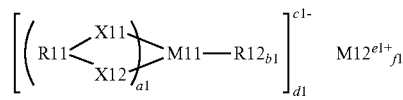

where R11 represents a —CO—R13-CO— group, wherein R13 represents an alkylene group, a halogenated alkylene group, an arylene group or a halogenated arylene group, a —CO—C(R14)(R15)-CO— group, wherein R14 and R15 each represent a hydrogen group, a halogen group, an alkyl group, a halogenated alkyl group, an aryl group or a halogenated aryl group or a —CO—CO— group, R12 represents a halogen group, an alkyl group, a halogenated alkyl group, an aryl group or a halogenated aryl group, X11 and X12 each represent oxygen or sulfur, M11 represents a transition metal element or a Group 3B element, a Group 4B element or a Group 5B element in the short form of the periodic table of the elements, M12 represents a Group 1A element or a Group 2A element in the short form of the periodic table of the elements, a1 is an integer of 1 to 4, b1 is 0 or an integer of 1 to 8, and c1 to f1 each are an integer of 1 to 3.

24. The battery according to claim 23, wherein the compound shown in Chemical Formula 11 includes a compound shown in Chemical Formula 12:

[Chemical Formula 12]

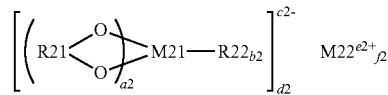

where R21 represents a —CO—R23-CO— group, wherein R23 represents an alkylene group, a halogenated alkylene group, an arylene group or a halogenated arylene group, a —CO—C(R24)$_2$—CO— group wherein (R24 represents a hydrogen group, a halogen group, an alkyl group, a halogenated alkyl group, a aryl group or a halogenated aryl group, or a —CO—CO— group, R22 represents a halogen group, M21 represents phosphorus or boron, M22 represents a Group 1A element or a Group 2A element in the short form of the periodic table of the elements, a2 is an integer of 1 to 4, b2 is 0 or an integer of 2 or 4, c2 to f2 each are an integer of 1 to 3.

25. The battery according to claim 24, wherein the compound shown in Chemical Formula 12 includes at least one kind selected from the group consisting of difluoro[oxalate-O,O']lithium borate in Chemical Formula 13(1), difluoro bis[oxalate-O,O']lithium phosphate in Chemical Formula 13(2), difluoro[3,3,3-trifluoro-2-oxide-2-trifluoromethyl propionato(2+O,O')lithium borate in Chemical Formula 13(3), bis[3,3,3-trifluoro-2-oxide-2-trifluoromethyl propionato(2-)-O,O']lithium borate in Chemical Formula 13(4), tetrafluoro[oxalate-O,O']lithium phosphate in Chemical Formula 13(5) and bis[oxalate-O,O']lithium borate in Chemical Formula 13(6):

[Chemical Formula 13]

(1) 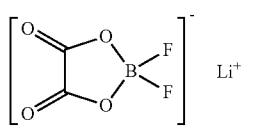

(2) 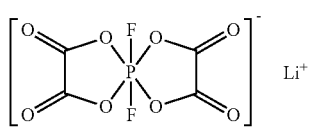

(3) 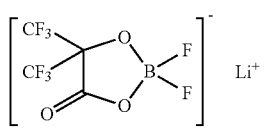

(4) 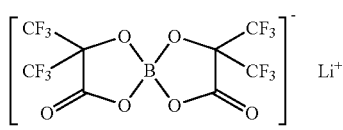

(5) 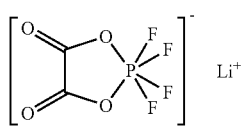

(6) 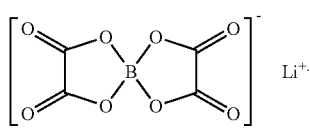

26. The battery according to claim 22, wherein the electrolyte salt further includes at least one kind selected from the group consisting of compounds shown in Chemical Formulas 14 to 16:

$$\text{LiN}(C_mF_{2m+1}SO_2)(C_nF_{2n+1}SO_2) \quad \text{[Chemical Formula 14]}$$

where m and n each are an integer of 1 or more, and may be the same as or different from each other,

[Chemical Formula 15]

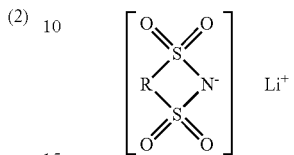

where R represents a straight-chain or branch perfluoroalkylene group having 2 to 4 carbon atoms, $$\text{LiC}(C_pF_{2p+1}SO_2)(C_qF_{2q+1}SO_2)(C_rF_{2r+1}SO_2) \quad \text{[Chemical Formula 16]}$$

where p, q and r each are an integer of 1 or more.

27. The battery according to claim 14, wherein the anode includes a material capable of inserting and extracting lithium and including at least one kind selected from the group consisting of metal elements and metalloid elements as an element.

28. The battery according to claim 14, wherein the anode includes at least one kind selected from the group consisting of silicon and tin.

29. An electrolytic solution comprising:
   a solvent;
   an electrolyte salt; and
   an acyl halide selected from the group consisting of succinyl chloride, succinyl fluoride and oxalyl fluoride.

30. A battery comprising a cathode, an anode and an electrolytic solution, wherein the electrolytic solution includes:
   a solvent;
   an electrolyte salt; and
   an acyl halide selected from the group consisting of succinyl chloride, succinyl fluoride and oxalyl fluoride.

* * * * *